United States Patent
Suyama et al.

(10) Patent No.: US 12,375,345 B2
(45) Date of Patent: Jul. 29, 2025

(54) RELAY DEVICE, VEHICLE COMMUNICATION SYSTEM, VEHICLE, COMMUNICATION METHOD, AND COMMUNICATION PROGRAM

(71) Applicants: SUMITOMO ELECTRIC INDUSTRIES, LTD., Osaka (JP); SUMITOMO WIRING SYSTEMS, LTD., Yokkaichi (JP); AUTONETWORKS TECHNOLOGIES, LTD., Yokkaichi (JP)

(72) Inventors: Yojiro Suyama, Osaka (JP); Hideyuki Tanaka, Osaka (JP); Tatsuya Izumi, Osaka (JP); Yusuke Yamamoto, Osaka (JP); Takeshi Hagihara, Yokkaichi (JP); Darmawan Go, Yokkaichi (JP); Yosuke Shimizu, Yokkaichi (JP)

(73) Assignees: SUMITOMO ELECTRIC INDUSTRIES, LTD., Osaka (JP); SUMITOMO WIRING SYSTEMS, LTD., Mie (JP); AUTONETWORKS TECHNOLOGIES, LTD., Mie (JP)

( * ) Notice: Subject to any disclaimer, the term of this patent is extended or adjusted under 35 U.S.C. 154(b) by 0 days.

(21) Appl. No.: 18/403,973

(22) Filed: Jan. 4, 2024

(65) Prior Publication Data

US 2024/0146604 A1 May 2, 2024

Related U.S. Application Data

(63) Continuation of application No. 17/622,892, filed as application No. PCT/JP2020/026113 on Jul. 3, 2020, now Pat. No. 12,113,665.

(30) Foreign Application Priority Data

Aug. 1, 2019 (JP) .................... 2019-142240

(51) Int. Cl.
*H04L 41/0806* (2022.01)
*B60R 16/023* (2006.01)
(Continued)

(52) U.S. Cl.
CPC ........ *H04L 41/0806* (2013.01); *B60R 16/023* (2013.01); *H04L 12/46* (2013.01); *H04L 67/12* (2013.01)

(58) Field of Classification Search
CPC ..... H04L 41/0806; H04L 12/46; H04L 67/12; B60R 16/023
(Continued)

(56) References Cited

U.S. PATENT DOCUMENTS 5,907,540 A 5/1999 Hayashi
2002/0146002 A1 10/2002 Sato
(Continued)

FOREIGN PATENT DOCUMENTS

CN 102333118 A 1/2012
CN 106961437 A 7/2017
(Continued)

OTHER PUBLICATIONS

Apr. 26, 2024 Notice Of Allowance Issued in U.S. Appl. No. 17/622,892.
(Continued)

*Primary Examiner* — Ninos Donabed
(74) *Attorney, Agent, or Firm* — Oliff PLC

(57) ABSTRACT

An information of a network to which a new function unit has been added is easily acquired. A relay device installed in a vehicle includes: a detection unit configured to detect a new function unit being a function unit that is newly added to a network including an existing function unit being one or a plurality of function units; a relay unit configured to relay a frame between the function units; and an acquisition unit
(Continued)

configured to acquire, from the frame, relayed by the relay unit, between the new function unit detected by the detection unit and the existing function unit, function unit information that includes information regarding a network configuration of a layer of a lower order than an application layer, the function unit information being of at least one of the new function unit and the existing function unit.

13 Claims, 14 Drawing Sheets

(51) Int. Cl.
    *H04L 12/46*    (2006.01)
    *H04L 67/12*    (2022.01)
(58) Field of Classification Search
    USPC ........................................................ 709/222
    See application file for complete search history.

(56) References Cited

U.S. PATENT DOCUMENTS

| | | |
|---|---|---|
| 2007/0185624 A1 | 8/2007 | Duddles et al. |
| 2008/0059806 A1 | 3/2008 | Kishida et al. |
| 2010/0002710 A1 | 1/2010 | Isoyama |
| 2010/0302974 A1 | 12/2010 | Niiyama et al. |
| 2010/0313242 A1 | 12/2010 | Sato |
| 2012/0054835 A1 | 3/2012 | Oda et al. |
| 2012/0277949 A1 | 11/2012 | Ghimire et al. |
| 2013/0010640 A1 | 1/2013 | Higuchi et al. |
| 2014/0068099 A1 | 3/2014 | Komori |
| 2015/0145648 A1 | 5/2015 | Winkelman |
| 2015/0172298 A1 | 6/2015 | Otsuka |
| 2016/0315766 A1 | 10/2016 | Ujiie et al. |
| 2016/0373449 A1 | 12/2016 | Haga et al. |
| 2017/0134164 A1 | 5/2017 | Haga et al. |
| 2017/0331767 A1* | 11/2017 | Zinner ...................... H04L 1/08 |
| 2017/0352210 A1 | 12/2017 | Maiwand et al. |
| 2018/0009446 A1 | 1/2018 | Ricci |
| 2018/0077062 A1 | 3/2018 | Park et al. |
| 2018/0115490 A1 | 4/2018 | Kawasaki |
| 2018/0139634 A1 | 5/2018 | Zhu et al. |
| 2018/0367546 A1 | 12/2018 | Miyashita |
| 2019/0044730 A1 | 2/2019 | Woo et al. |
| 2019/0173912 A1 | 6/2019 | Ujiie et al. |
| 2019/0197468 A1 | 6/2019 | Endo et al. |
| 2019/0334897 A1 | 10/2019 | Anzai et al. |
| 2019/0356608 A1 | 11/2019 | Tanaka et al. |
| 2019/0394065 A1 | 12/2019 | Okubo et al. |
| 2020/0029213 A1 | 1/2020 | Nölscher et al. |
| 2020/0084025 A1 | 3/2020 | Ujiie et al. |
| 2020/0106704 A1 | 4/2020 | Iwata et al. |
| 2020/0137049 A1 | 4/2020 | Ogawa et al. |
| 2020/0220716 A1 | 7/2020 | Haga et al. |
| 2020/0366529 A1 | 11/2020 | Park |
| 2021/0028925 A1 | 1/2021 | Ujiie et al. |
| 2021/0329002 A1 | 10/2021 | Huh et al. |

FOREIGN PATENT DOCUMENTS

| | | |
|---|---|---|
| CN | 108881247 A | 11/2018 |
| JP | 2002-314573 A | 10/2002 |
| JP | 2003-046536 A | 2/2003 |
| JP | 2003-244185 A | 8/2003 |
| JP | 2008-059450 A | 3/2008 |
| JP | 2010-183204 A | 8/2010 |
| JP | 2010-283607 A | 12/2010 |
| JP | 2013-017021 A | 1/2013 |
| JP | 2013-193598 A | 9/2013 |
| JP | 2016-127299 A | 7/2016 |
| JP | 2016-134170 A | 7/2016 |
| JP | 2016-152429 A | 8/2016 |
| JP | 2017-005617 A | 1/2017 |
| JP | 2017-059210 A | 3/2017 |
| JP | 2017-212728 A | 11/2017 |
| JP | 2017-220220 A | 12/2017 |
| JP | 2018-117254 A | 7/2018 |
| JP | 2018113505 A | 7/2018 |
| JP | 2018-152758 A | 9/2018 |
| JP | 2018-174481 A | 11/2018 |
| JP | 2018-192876 A | 12/2018 |
| JP | 2019-016247 A | 1/2019 |
| WO | 2013/161873 A1 | 10/2013 |
| WO | 2016/075865 A1 | 5/2016 |
| WO | 2016/075869 A1 | 5/2016 |
| WO | 2016/204081 A1 | 12/2016 |

OTHER PUBLICATIONS

Jan. 24, 2024 U.S. Office Action issued in U.S. Appl. No. 17/624,784.
Apr. 15, 2024 Office Action issued in U.S. Appl. No. 17/612,136.
Apr. 10, 2024 Office Action Issued in U.S. Appl. No. 17/615,174.
May 15, 2024 U.S. Notice of Allowance issued in U.S. Appl. No. 17/624,784.
The U.S. Appl. No. 17/615,174, filed Nov. 30, 2021 in the name of Yusuke Yamamoto et al.
The U.S. Appl. No. 17/624,784, filed Jan. 4, 2022 in the name of Yojiro Suyama et al.
The U.S. Appl. No. 17/612,136, filed Nov. 17, 2021 in the name of Yusuke Yamamoto et al.
Mar. 16, 2023 Office Action Issued In U.S. Appl. No. 17/615,174.
Sep. 7, 2023 U.S. Office Action issued U.S. Appl. No. 17/615,174.
Jan. 4, 2024 U.S. Office Action issued in U.S. Appl. No. 17/612,136.
Sep. 29, 2024 Office Action issed in U.S. Appl. No. 17/612,136.
U.S. Appl. No. 18/781,541, filed Jul. 23, 2024 in the name of Yojiro Suyama et al.
Oct. 28, 2024 Notice of Allowance issued in U.S. Appl. No. 17/624,784.
Oct. 23, 2024 Office Action issued in U.S. Appl. No. 17/615,174.
Jan. 10, 2025 Ex Parte Quayle Action issued in U.S. Appl. No. 17/615,174.
Jan. 27, 2025 Notice of Allowance issued in U.S. Appl. No. 17/612,136.
Feb. 4, 2025 Notice of Allowance issued in U.S. Appl. No. 17/624,784.
Feb. 26, 2025 Notice of Allowance issued in U.S. Appl. No. 17/615,174.
May 20, 2025 Notice of Allowance Issued in U.S. Appl. No. 17/612,136.
May 21, 2025 Notice of Allowance received in U.S. Appl. No. 17/624,784.
U.S. Appl. No. 19/214,569, filed May 21, 2025 in the name of Yamamoto.

* cited by examiner

FIG. 8

| HEADER | TRANSMISSION SOURCE IP ADDRESS | TRANSMISSION DESTINATION IP ADDRESS | OPTION FIELD | DATA FIELD | ADDITIONAL INFORMATION FIELD |
|---|---|---|---|---|---|

FIG. 9

| HARDWARE DEVICE | PORT NUMBER | VLAN ID |
|---|---|---|
| TCU 111A | 1 | VLAN10 |
| AUTOMATED DRIVING ECU 111B | 1 | VLAN20 |
| ENGINE ECU 111C | 1 | VLAN20 |
| TEMPERATURE SENSOR 111D | 1 | VLAN30 |
| WATER TEMPERATURE SENSOR 111E | 1 | VLAN30 |
| RELAY DEVICE 200 | 1 | VLAN10 |
| RELAY DEVICE 200 | 2 | VLAN20 |
| RELAY DEVICE 200 | 3 | VLAN20, VLAN30 |
| IMAGE SENSOR 111G | 1 | VLAN20 |

RELAY DEVICE, VEHICLE COMMUNICATION SYSTEM, VEHICLE, COMMUNICATION METHOD, AND COMMUNICATION PROGRAM

CROSS REFERENCE TO RELATED APPLICATION

This application is a continuation of U.S. application Ser. No. 17/622,892, filed Dec. 27, 2021, the contents of which are incorporated herein by reference.

TECHNICAL FIELD

The present disclosure relates to a relay device, a vehicle communication system, a vehicle, a communication method, and a communication program.

This application claims priority on Japanese Patent Application No. 2019-142240 filed on Aug. 1, 2019, the entire content of which is incorporated herein by reference.

BACKGROUND ART

PATENT LITERATURE 1 (Japanese Laid-Open Patent Publication No. 2018-192876) discloses a driving support device as below. That is, the driving support device is a driving support device that can be connected to an intra-vehicular network that includes one or more communication buses. The driving support device includes: a message acquisition unit that acquires a communication message sent in a communication bus; a determination unit that determines whether or not an electronic control device for vehicle control is connected to the communication bus, on the basis of the communication message acquired by the message acquisition unit; and a communication control unit that stops, when the determination unit has determined that the electronic control device is connected to the communication bus, transmission of the communication message to the communication bus to which the electronic control device is connected.

PATENT LITERATURE 2 (Japanese Laid-Open Patent Publication No. 2017-220220) discloses a vehicular electronic control device as below. That is, the vehicular electronic control device is a vehicular electronic control device (1 to 5) that is connected to an in-vehicle network (6) and that executes a predetermined function through an installed application. The vehicular electronic control device includes: a service interface (8) that, in response to a request from the application, requests a service that uses a function installed in another vehicular electronic control device connected to the in-vehicle network, and that, upon receiving a request for a service from the other vehicular electronic control device, generates a service so as to respond thereto; a service bus (9) that transmits/receives a message that corresponds to a request of service and a response by using a predetermined protocol between the service interface and the service interface of the other vehicular electronic control device; and a service management unit (11) that allows the service to be dynamically and mutually used, by managing the position of the service.

CITATION LIST

Patent Literature

PATENT LITERATURE 1: Japanese Laid-Open Patent Publication No. 2018-192876
PATENT LITERATURE 2: Japanese Laid-Open Patent Publication No. 2017-220220

SUMMARY OF INVENTION

A relay device of the present disclosure is installed in a vehicle. The relay device includes: a detection unit configured to detect a new function unit being a function unit that is newly added to a network including an existing function unit being one or a plurality of function units; a relay unit configured to relay a frame between the function units; and an acquisition unit configured to acquire, from the frame, relayed by the relay unit, between the new function unit detected by the detection unit and the existing function unit, function unit information that includes information regarding a network configuration of a layer of a lower order than an application layer, the function unit information being of at least one of the new function unit and the existing function unit.

A vehicle communication system of the present disclosure includes: a relay device installed in a vehicle; an existing function unit being one or a plurality of function units forming a network; and a new function unit being a function unit that is newly added to the network. The relay device detects addition of the new function unit to the network. The new function unit or the existing function unit transmits a frame that is addressed to another function unit and that has stored therein function unit information that includes information regarding a network configuration of a layer of a lower order than an application layer. The relay device acquires the function unit information from the frame transmitted by the new function unit or the existing function unit.

A communication method of the present disclosure is to be performed in a relay device. The relay device is installed in a vehicle and configured to relay a frame between function units. The communication method includes the steps of: detecting a new function unit being a function unit that is newly added to a network including an existing function unit being one or a plurality of the function units; and acquiring, from the frame that should be relayed between the new function unit detected and the existing function unit, function unit information that includes information regarding a network configuration of a layer of a lower order than an application layer, the function unit information being of at least one of the new function unit and the existing function unit.

A communication method of the present disclosure is to be performed in a vehicle communication system. The vehicle communication system includes a relay device installed in a vehicle, an existing function unit being one or a plurality of function units forming a network, and a new function unit being a function unit that is newly added to the network. The communication method includes the steps of: detecting, performed by the relay device, addition of the new function unit to the network; transmitting, performed by the new function unit or the existing function unit, a frame that is addressed to another function unit and that has stored therein function unit information that includes information regarding a network configuration of a layer of a lower order than an application layer; and acquiring, performed by the relay device, the function unit information from the frame transmitted by the new function unit or the existing function unit.

A communication program of the present disclosure is to be used in a relay device installed in a vehicle. The communication program is for causing a computer to function as: a detection unit configured to detect a new function unit being a function unit that is newly added to a network including an existing function unit being one or a plurality of function units; a relay unit configured to relay a frame between the function units; and an acquisition unit configured to acquire, from the frame, relayed by the relay unit, between the new function unit detected by the detection unit and the existing function unit, function unit information that includes information regarding a network configuration of a layer of a lower order than an application layer, the function unit information being of at least one of the new function unit and the existing function unit.

One mode of the present disclosure can be realized as a semiconductor integrated circuit that realizes a part or the entirety of the relay device. One mode of the present disclosure can be realized as a semiconductor integrated circuit that realizes a part or the entirety of the vehicle communication system. One mode of the present disclosure can be realized as a program for causing a computer to execute process steps in the vehicle communication system.

BRIEF DESCRIPTION OF DRAWINGS

FIG. 8 shows an example of a communication setting frame transmitted by a function unit according to the embodiment of the present disclosure.

FIG. 9 shows an example of configuration information generated by a generation unit according to the embodiment of the present disclosure.

DESCRIPTION OF EMBODIMENTS

Figure 1:
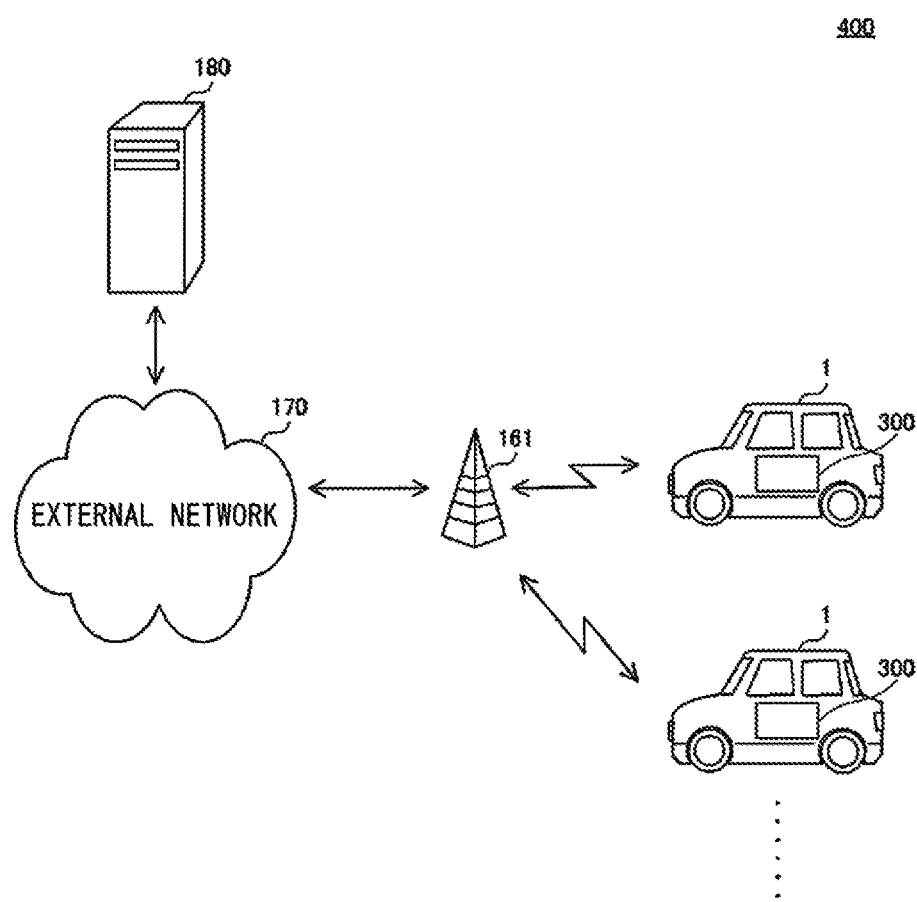
FIG. 1 shows a configuration of a communication system according to an embodiment of the present disclosure.

In recent years, in association with prevalence of car sharing and a desire for improvement of processing capacities of in-vehicle devices installed in vehicles, there has been a demand for customization of an in-vehicle network through addition of applications to the in-vehicle network. Thus, there is a demand for a technology that allows addition or removal of various applications with respect to an in-vehicle network in accordance with needs of a user.

Problems to be Solved by the Present Disclosure

Exceeding the technologies described in PATENT LITERATURE 1 and 2, a technology that allows easy acquisition of information of a network when a new function unit has been added to the network, is desired.

The present disclosure has been made in order to solve the above problem. An object of the present disclosure is to provide a relay device, a vehicle communication system, a vehicle, a communication method, and a communication program that allow easy acquisition of information of a network to which a new function unit has been added.

Effects of the Present Disclosure

According to the present disclosure, information of a network to which a new function unit has been added can be easily acquired.

DESCRIPTION OF EMBODIMENT OF THE PRESENT DISCLOSURE

First, the contents of an embodiment of the present disclosure are listed and described.

(1) A relay device according to the embodiment of the present disclosure is installed in a vehicle. The relay device includes: a detection unit configured to detect a new function unit being a function unit that is newly added to a network including an existing function unit being one or a plurality of function units; a relay unit configured to relay a frame between the function units; and an acquisition unit configured to acquire, from the frame, relayed by the relay unit, between the new function unit detected by the detection unit and the existing function unit, function unit information that includes information regarding a network configuration of a layer of a lower order than an application layer, the function unit information being of at least one of the new function unit and the existing function unit.

Thus, with this configuration in which the function unit information is acquired from the frame between function units, the function unit information can be acquired from the frame that should be relayed between the new function unit and the existing function unit in order to establish communication connection between the new function unit and the existing function unit, for example. Therefore, it is possible to acquire the function unit information without sending and receiving a frame for acquiring the function unit information between function units. Therefore, information of a network to which a new function unit has been added can be easily acquired.

(2) Preferably, the function unit information is information that is to be used in generation of configuration information of a new network being the network that further includes the new function unit.

With this configuration, it is possible to construct a new network in consideration of the network configuration and restriction of a layer of a lower order than the application layer, for example. Accordingly, for example, occurrence of delay in high importance communication due to addition of a new function unit to the network can be suppressed.

(3) Preferably, the acquisition unit acquires the function unit information from the frame transmitted by the new function unit and relayed to the existing function unit.

With this configuration, for example, the function unit information can be acquired from the frame transmitted by the new function unit that should transmit data to the existing function unit after establishment of communication connection.

(4) Preferably, the acquisition unit acquires the function unit information from the frame transmitted by the existing function unit and relayed to the new function unit.

With this configuration, for example, the function unit information can be acquired from the frame transmitted by the existing function unit that should transmit data to the new function unit after establishment of communication connection.

(5) Preferably, without changing transmission destination information and transmission source information that are included in the frame received from the function unit, the relay unit relays the frame to another function unit, and the acquisition unit acquires the function unit information from the frame relayed by the relay unit.

With this configuration, in the relay device that performs snooping on the frame between function units, the function unit information can be easily acquired.

(6) Preferably, the relay unit changes at least one of transmission destination information and transmission source information that are included in the frame received from the function unit, and relays the frame after having been changed, to another function unit, and the acquisition unit acquires the function unit information from the frame relayed by the relay unit.

With this configuration, in the relay device functioning as a proxy server, the function unit information can be easily acquired.

(7) Preferably, the relay device further includes a generation unit configured to generate configuration information of a new network being the network that further includes the new function unit, on the basis of the function unit information acquired by the acquisition unit.

With this configuration, it is possible to construct a new network in consideration of the network configuration and restriction of a layer of a lower order than the application layer, by using the function unit information. Accordingly, for example, occurrence of delay in high importance communication due to addition of a new function unit to the network can be suppressed.

(8) Preferably, the function unit information is information that is not to be processed in a function unit that should receive the frame.

With this configuration, the function unit information can be acquired from the frame without increasing the processing load in the function unit that should receive the frame.

(9) Preferably, the detection unit: detects, as the new function unit, at least one of an application included in an in-vehicle ECU (Electronic Control Unit) that is newly added to the network, an application that is newly installed into an in-vehicle ECU in the network, and an application included in an external device that is newly added, outside the vehicle, to the network; performs an authentication process regarding the new function unit detected; and notifies the new function unit of a result of the authentication process.

With this configuration, diverse new function units can be detected, and a new network can be constructed.

(10) A vehicle according to the embodiment of the present disclosure includes the relay device.

With this configuration, in the vehicle including the relay device, information of a network to which a new function unit has been added can be easily acquired.

(11) A vehicle communication system according to the embodiment of the present disclosure includes: a relay device installed in a vehicle; an existing function unit being one or a plurality of function units forming a network; and a new function unit being a function unit that is newly added to the network. The relay device detects addition of the new function unit to the network. The new function unit or the existing function unit transmits a frame that is addressed to another function unit and that has stored therein function unit information that includes information regarding a network configuration of a layer of a lower order than an application layer. The relay device acquires the function unit information from the frame transmitted by the new function unit or the existing function unit.

Thus, with this configuration in which the function unit information is acquired from the frame transmitted by the new function unit or the existing function unit, the function unit information can be acquired from the frame that should be relayed between the new function unit and the existing function unit in order to establish communication connection between the new function unit and the existing function unit, for example. Therefore, it is possible to acquire the function unit information without sending and receiving a frame for acquiring the function unit information between function units. Therefore, information of a network to which a new function unit has been added can be easily acquired.

(12) A communication method according to the embodiment of the present disclosure is to be performed in a relay device. The relay device is installed in a vehicle and configured to relay a frame between function units. The communication method includes the steps of: detecting a new function unit being a function unit that is newly added to a network including an existing function unit being one or a plurality of the function units; and acquiring, from the frame that should be relayed between the new function unit detected and the existing function unit, function unit information that includes information regarding a network configuration of a layer of a lower order than an application layer, the function unit information being of at least one of the new function unit and the existing function unit.

Thus, with this method in which the function unit information is acquired from the frame that should be relayed between the new function unit and the existing function unit, the function unit information can be acquired from the frame that should be relayed between the new function unit and the existing function unit in order to establish communication connection between the new function unit and the existing function unit, for example. Therefore, it is possible to acquire the function unit information without sending and receiving a frame for acquiring the function unit information between function units. Therefore, information of a network to which a new function unit has been added can be easily acquired.

(13) A communication method according to the embodiment of the present disclosure is to be performed in a vehicle communication system. The vehicle communication system includes a relay device installed in a vehicle, an existing function unit being one or a plurality of function units forming a network, and a new function unit being a function unit that is newly added to the network. The communication method includes the steps of: detecting, performed by the relay device, addition of the new function unit to the network; transmitting, performed by the new function unit or the existing function unit, a frame that is addressed to another function unit and that has stored therein function unit information that includes information regarding a network configuration of a layer of a lower order than an application layer; and acquiring, performed by the relay device, the function unit information from the frame transmitted by the new function unit or the existing function unit.

With this method in which the function unit information is acquired from the frame transmitted by the new function unit or the existing function unit, the function unit information can be acquired from the frame that should be relayed between the new function unit and the existing function unit in order to establish communication connection between the new function unit and the existing function unit, for example. Therefore, it is possible to acquire the function unit information without sending and receiving a frame for acquiring the function unit information between function units. Therefore, information of a network to which a new function unit has been added can be easily acquired.

(14) A communication program according to the embodiment of the present disclosure is to be used in a relay device installed in a vehicle. The communication program is for causing a computer to function as: a detection unit configured to detect a new function unit being a function unit that is newly added to a network including an existing function unit being one or a plurality of function units; a relay unit configured to relay a frame between the function units; and an acquisition unit configured to acquire, from the frame, relayed by the relay unit, between the new function unit detected by the detection unit and the existing function unit, function unit information that includes information regarding a network configuration of a layer of a lower order than an application layer, the function unit information being of at least one of the new function unit and the existing function unit.

Thus, with this configuration in which the function unit information is acquired from the frame between function units, the function unit information can be acquired from the frame that should be relayed between the new function unit and the existing function unit in order to establish communication connection between the new function unit and the existing function unit, for example. Therefore, it is possible to acquire the function unit information without sending and receiving a frame for acquiring the function unit information between function units. Therefore, information of a network to which a new function unit has been added can be easily acquired.

Hereinafter, an embodiment of the present disclosure will be described with reference to the drawings. In the drawings, the same or corresponding parts are denoted by the same reference signs, and description thereof is not repeated. At least some parts of the embodiment described below may be combined as desired.

[Vehicle Communication System]

FIG. 1 shows a configuration of a communication system according to an embodiment of the present disclosure.

With reference to FIG. 1, a communication system 400 includes a server 180 and one or a plurality of vehicle communication systems 300. Each vehicle communication system 300 is installed in a vehicle 1.

Figure 2:
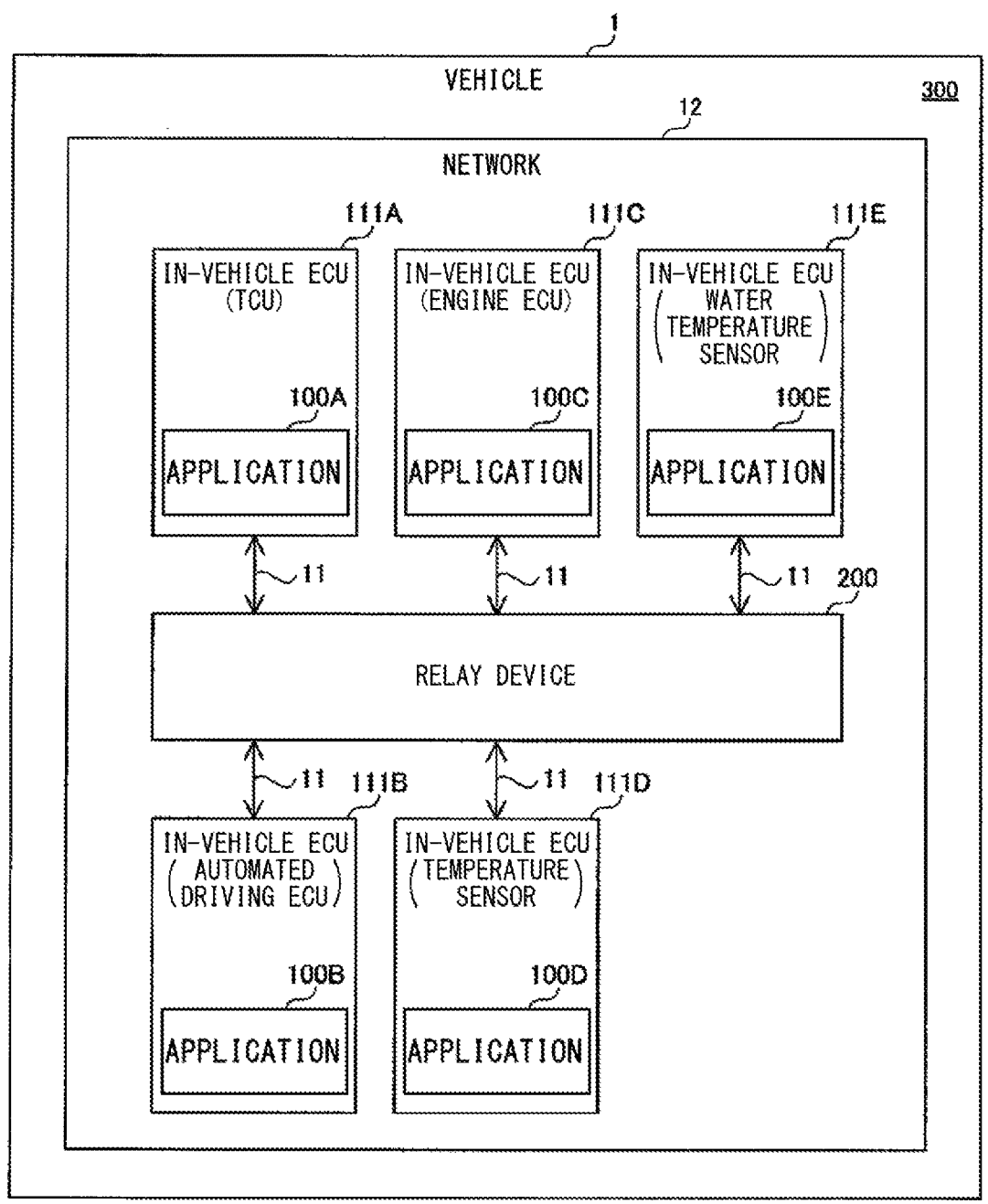
FIG. 2 shows an example of a configuration of a vehicle communication system according to the embodiment of the present disclosure.

FIG. 2 shows an example of a configuration of a vehicle communication system according to the embodiment of the present disclosure.

With reference to FIG. 2, the vehicle communication system 300 includes one or a plurality of in-vehicle ECUs 111, and a relay device 200. Specifically the vehicle communication system 300 includes in-vehicle ECU 111A to 111E as the in-vehicle ECUs 111.

The in-vehicle ECUs 111A to 111E each include an application 100.

More specifically, as the application 100, the in-vehicle ECU 111A includes an application 100A, the in-vehicle ECU 111B includes an application 100B, the in-vehicle ECU 111C includes an application 100C, the in-vehicle ECU 111D includes an application 100D, and the in-vehicle ECU 111E includes an application 100E.

The in-vehicle ECUs 111A to 111E and the relay device 200 form a network 12.

Each in-vehicle ECU 111 and each application 100 are examples of function units that are installed in the vehicle 1 among function units in the network 12.

The vehicle communication system 300 need not necessarily be provided with five in-vehicle ECUs 111 and may be provided with one, two, three, four, six, or more in-vehicle ECUs 111. The vehicle communication system 300 need not necessarily be configured such that one application 100 is provided to one in-vehicle ECU 111, and may be configured such that two or more applications 100 are provided to one in-vehicle ECU 111.

The vehicle communication system 300 need not necessarily be provided with one relay device 200, and may be provided with a plurality of relay devices 200.

The network 12 may include, as function units, an external device that is located outside the vehicle 1, and an application provided in the external device.

The in-vehicle ECUs 111 are, for example, a TCU (Telematics Communication Unit), an automated driving ECU, an engine ECU, a sensor, a navigation device, a human machine interface, a camera, and the like.

In this example, the in-vehicle ECUs 111A, 111B, 111C, 111D, 111E are a TCU, an automated driving ECU, an engine ECU, a temperature sensor, and a water temperature sensor, respectively.

Hereinafter, the in-vehicle ECUs 111A, 111B, 111C, 111D, 111E will also be referred to as a TCU 111A, an automated driving ECU 111B, an engine ECU 111C, a temperature sensor 111D, and a water temperature sensor 111E, respectively.

In the network 12, each of the in-vehicle ECUs 111A to 111E is connected to the relay device 200 via an Ethernet (registered trademark) cable 11.

The relay device 200 is a gateway device, for example, and can relay data between a plurality of in-vehicle ECUs 111 connected to the relay device 200.

The relay device 200 performs a relay process of an Ethernet frame in accordance with an Ethernet communication standard. Specifically, the relay device 200 relays an Ethernet frame sent and received between in-vehicle ECUs 111, for example. An IP packet is stored in the Ethernet frame.

In the vehicle communication system 300, relay of an Ethernet frame need not necessarily be performed in accordance with the Ethernet communication standard. For example, relay of data may be performed in accordance with a communication standard such as CAN (Controller Area Network) (registered trademark), FlexRay (registered trademark), MOST (Media Oriented Systems Transport) (registered trademark), or LIN (Local Interconnect Network).

With reference to FIG. 1 and FIG. 2, the TCU 111A can communicate with the server 180. Specifically, the TCU 111A can communicate with the server 180 via a wireless base station device 161 by using an IP packet, for example.

More specifically, the TCU 111A can perform wireless communication with the wireless base station device 161 in accordance with a communication standard such as LTE (Long Term Evolution) or 3G, for example.

Specifically, when the wireless base station device 161 has received an IP packet via an external network 170 from the server 180, the wireless base station device 161 causes the received IP packet to be included in a radio signal, and transmits the radio signal to the TCU 111A.

For example, when the TCU 111A has received, from the wireless base station device 161, the radio signal including the IP packet from the server 180, the TCU 111A acquires the IP packet from the received radio signal, stores the acquired IP packet into an Ethernet frame, and transmits the Ethernet frame to the relay device 200.

Meanwhile, when the TCU 111A has received an Ethernet frame from the relay device 200, the TCU 111A acquires an IP packet from the received Ethernet frame, causes the acquired IP packet to be included in a radio signal, and transmits the radio signal to the wireless base station device 161.

Upon receiving the radio signal from the TCU 111A, the wireless base station device 161 acquires the IP packet from the received radio signal, and transmits the acquired IP packet to the server 180 via the external network 170.

The automated driving ECU 111B can communicate with another in-vehicle ECU 111 via the relay device 200, and performs detection of the travelling state of the vehicle 1 by using measurement information from a sensor, and automated driving control based on the detection result, for example.

The engine ECU 111C can communicate with another in-vehicle ECU 111 via the relay device 200, and controls the engine in the vehicle 1, for example.

More specifically, the engine ECU 111C acquires pieces of information that indicate, for example, the number of revolutions of the engine, the vehicle speed of the vehicle 1, the shaft torque of the engine, the state of the transmission, the state of the throttle valve, a measurement value of each sensor, and the like, and controls the engine on the basis of the acquired information.

The engine ECU 111C can transmit a part or all of the acquired information to the relay device 200, in response to a request from the relay device 200, for example.

The temperature sensor 111D can communicate with another in-vehicle ECU 111 via the relay device 200, and periodically measures the outside air temperature of the vehicle 1, for example.

The water temperature sensor 111E can communicate with another in-vehicle ECU 111 via the relay device 200, and periodically measures the water temperature of cooling water circulating in the engine in the vehicle 1, for example.

Each application 100 performs a process of an application layer, for example, thereby performing a predetermined process in the in-vehicle ECU 111 in which the application 100 is provided. For example, the application 100D in the temperature sensor 111D generates, in a predetermined cycle, temperature information indicating the outside air temperature of the vehicle 1.

Figure 3:
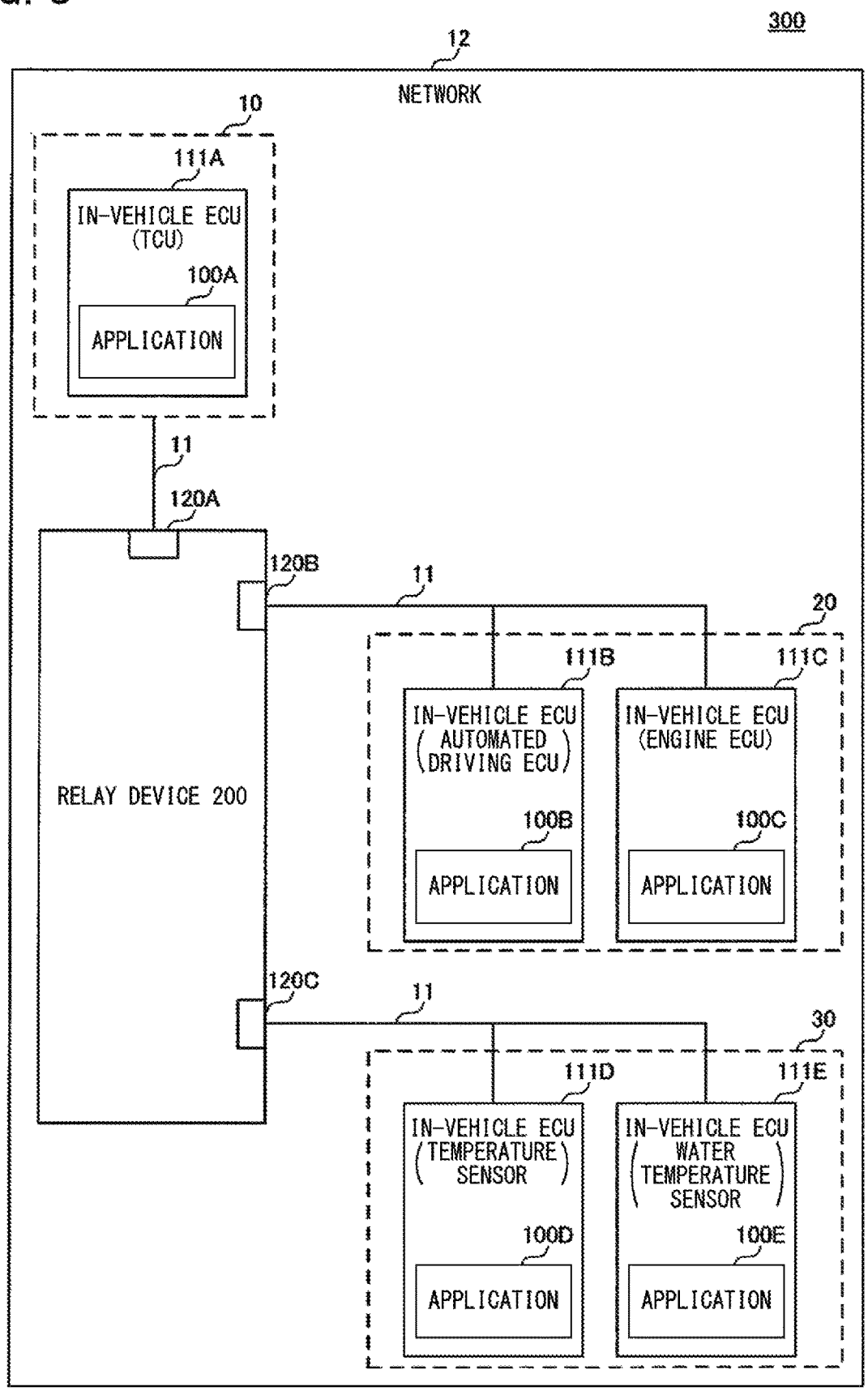
FIG. 3 shows an example of a network configuration in the vehicle communication system according to the embodiment of the present disclosure.

FIG. 3 shows an example of a network configuration in the vehicle communication system according to the embodiment of the present disclosure.

With reference to FIG. 3, the relay device 200 includes communication ports 120A, 120B, 120C. Each of the communication ports 120A, 120B, 120C will also be referred to as a communication port 120. Each communication port 120 is a terminal to which an Ethernet cable 11 can be connected, for example.

In the example shown in FIG. 3, the TCU 111A is connected to the communication port 120A, the automated driving ECU 111B and the engine ECU 111C are connected to the communication port 120B, and the temperature sensor 111D and the water temperature sensor 111E are connected to the communication port 120C.

In the network 12, the TCU 111A belongs to a VLAN (Virtual Local Area Network) 10. The automated driving ECU 111B and the engine ECU 111C belong to a VLAN 20 different from the VLAN 10. The temperature sensor 111D and the water temperature sensor 111E belong to a VLAN 30 different from the VLAN 10 and the VLAN 20.

The relay device 200 performs a relay process of an Ethernet frame between in-vehicle ECUs 111 that belong to the same VLAN, for example. Specifically, on the basis of the transmission source MAC (Media Access Control) address and the transmission destination MAC address that are included in a received Ethernet frame, the relay device 200 transmits the Ethernet framed to the transmission destination in-vehicle ECU 111.

The relay device 200 performs a relay process of an IP packet between in-vehicle ECUs 111 that belong to different VLANs, for example. Specifically, the relay device 200 acquires an IP packet from a received Ethernet frame, and transmits the IP packet to the transmission destination in-vehicle ECU 111 on the basis of the transmission destination IP address of the acquired IP packet.

[Relay Device]

Figure 4:
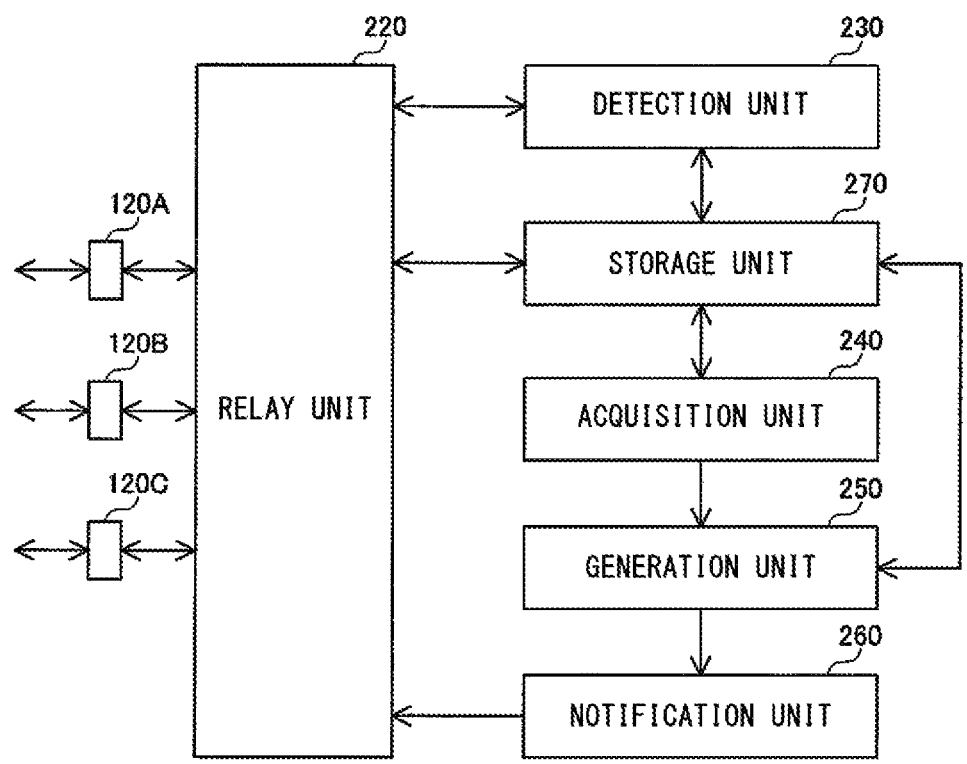
FIG. 4 shows a configuration of a relay device 200 according to the embodiment of the present disclosure.

FIG. 4 shows a configuration of the relay device 200 according to the embodiment of the present disclosure.

With reference to FIG. 4, the relay device 200 includes the communication ports 120A, 120B, 120C, a relay unit 220, a detection unit 230, an acquisition unit 240, a generation unit 250, a notification unit 260, and a storage unit 270. The storage unit 270 is a flash memory, for example. Hereinafter, each of the communication ports 120A, 120B, 120C will also be referred to as a communication port 120.

The relay unit 220, the detection unit 230, the acquisition unit 240, the generation unit 250, and the notification unit 260 are each realized by a processor such as a CPU (Central Processing Unit), a DSP (Digital Signal Processor), or the like, for example.

[Relay Unit]

The relay unit 220 relays a frame between in-vehicle ECUs 111. Specifically, for example, when the relay unit 220 has received an Ethernet frame from a certain in-vehicle ECU 111 via a corresponding communication port 120, the relay unit 220 performs a relay process of a layer 2 and a relay process of a layer 3 with respect to the received Ethernet frame.

For example, without changing transmission destination information and transmission source information that are included in a frame received from an in-vehicle ECU 111, the relay unit 220 relays the frame to another in-vehicle ECU 111.

Specifically, for example, when the relay unit 220 has received, from the automated driving ECU 111B belonging to the VLAN 20, an Ethernet frame addressed to the engine ECU 111C belonging to the VLAN 20, the relay unit 220 performs, without changing the transmission destination MAC address and the transmission source MAC address that are included in the received Ethernet frame, the relay process to the engine ECU 111C in accordance with the transmission destination MAC address and the transmission source MAC address.

Alternatively, the relay unit 220 changes at least one of the transmission destination information and the transmission source information that are included in the frame received from the in-vehicle ECU 111, and relays the frame after having been changed, to another in-vehicle ECU 111.

As an example, when the relay unit 220 has received, from the temperature sensor 111D belonging to the VLAN 30, an Ethernet frame addressed to the engine ECU 111C belonging to the VLAN 20, for example, the relay unit 220 changes the transmission destination MAC address and the transmission source MAC address that are included in the received Ethernet frame, and relays the Ethernet frame after having been changed, to the destination engine ECU 111C.

As another example, when the relay unit 220 has received an Ethernet frame from an in-vehicle ECU 111, the relay unit 220 changes at least one of the transmission destination IP address and the transmission source IP address that are included in the received Ethernet frame, and relays the Ethernet frame after having been changed, to another in-vehicle ECU 111.

Specifically, for example, the relay unit 220 functions as a proxy of the transmission source in-vehicle ECU 111 for an Ethernet frame. More specifically, when the relay unit 220 has received an Ethernet frame from the water temperature sensor 111E, the relay unit 220 changes the transmission source IP address included in the received Ethernet frame to the IP address of the relay unit 220, and relays the Ethernet frame after having been changed, to the engine ECU 111C.

Then, when, as a response to the Ethernet frame, the relay unit 220 has received, from the engine ECU 111C, an Ethernet frame that has the IP address of the relay unit 220 as the transmission destination IP address, the relay unit 220 changes the transmission destination IP address included in the received Ethernet frame to the IP address of the water temperature sensor 111E, and relays the Ethernet frame after having been changed, to the water temperature sensor 111E.

The relay unit 220 may be configured to change information that is included in the frame received from an in-vehicle ECU 111 and that is stored in a field other than those of the transmission destination information and the transmission source information, and to relay the frame after having been changed, to another in-vehicle ECU 111.

[Detection Unit]

The detection unit 230 detects a new function unit being a function unit that is newly added to the network 12. More specifically, the detection unit 230 detects, as a new function unit, a function unit, such as an in-vehicle ECU 111, an external device, and an application 100, that is newly added to the network 12. As an example, the detection unit 230 detects, as a new ECU, an in-vehicle ECU 111 that is newly added to the network 12.

For example, the new function unit transmits, to the relay device 200, connection request information for requesting communication connection in the network 12.

The detection unit 230 receives the connection request information via the relay unit 220 to detect the new function unit being the transmission source of the connection request information.

The detection unit 230 may be configured to broadcast, for example, periodically, a search message for detecting a new function unit. In this case, the new function unit receives the search message and transmits the aforementioned connection request information as a response to the received search message.

Hereinafter, the network 12 that includes a new function unit will also be referred to as a new network, the network 12 before a new function unit is added will also be referred to an existing network, and each function unit included in the existing network will also be referred to as an existing function unit. Each in-vehicle ECU 111 included in the existing network is an example of the existing function unit, i.e., an existing ECU.

Figure 5:
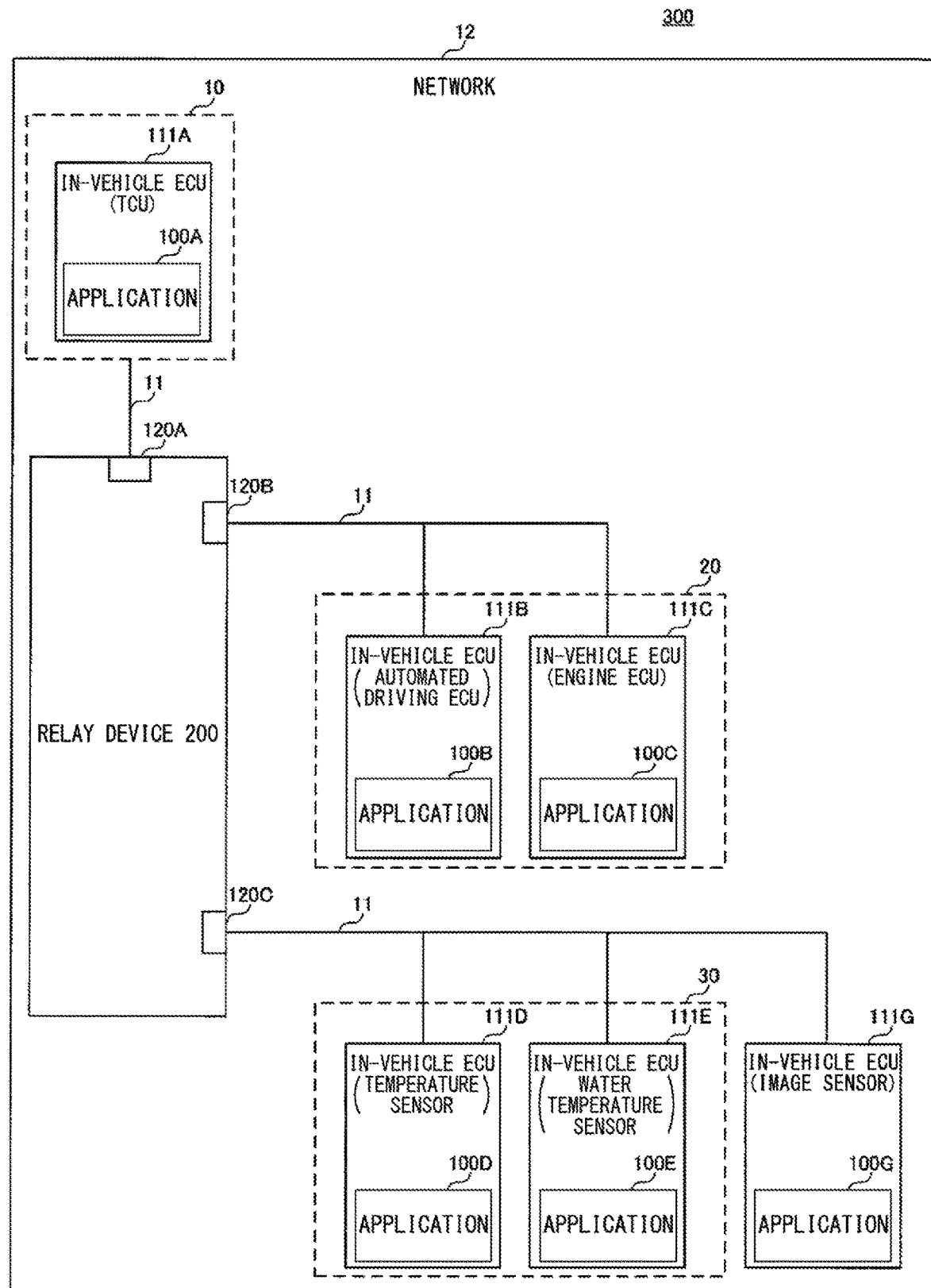
FIG. 5 shows an example of a configuration of a new network in the vehicle communication system according to the embodiment of the present disclosure.

FIG. 5 shows an example of a configuration of a new network in the vehicle communication system according to the embodiment of the present disclosure.

With reference to FIG. 5, a case where an in-vehicle ECU 111G is newly added to the network 12 is assumed. In this example, the in-vehicle ECU 111G is an image sensor. Hereinafter, the in-vehicle ECU 111G will also be referred to as an image sensor 111G. The image sensor 111G includes an application 100G being a new function unit.

When the image sensor 111G has been supplied with power and connected to the communication port 120C in the relay device 200 via an Ethernet cable 11, for example, the image sensor 111G transmits connection request information for requesting communication connection in the network 12, to the detection unit 230 in the relay device 200.

More specifically, the application 100G in the image sensor 111G generates an Ethernet frame that includes connection request information, the ID of the application 100G, and the MAC address of the relay device 200 as the transmission destination MAC address, and transmits the generated Ethernet frame to the relay device 200.

When the detection unit 230 in the relay device 200 has received the Ethernet frame transmitted from the application 100G, the detection unit 230 performs an authentication process regarding the application 100G by using the ID and the like included in the received Ethernet frame.

When the detection unit 230 has succeeded in authentication of the application 100G, the detection unit 230 generates an Ethernet frame that includes authentication success information indicating that the authentication has been successful, and the MAC address of the image sensor 111G as the transmission destination MAC address, and transmits the generated Ethernet frame to the image sensor 111G via the relay unit 220.

The new function unit that is detected by the detection unit 230 is not limited to an application 100 included in an in-vehicle ECU 111 that is newly connected to the relay device 200. For example, the detection unit 230 may be configured to detect, as a new function unit, an application 100 that is installed in an in-vehicle ECU 111 in the existing network.

Figure 6:
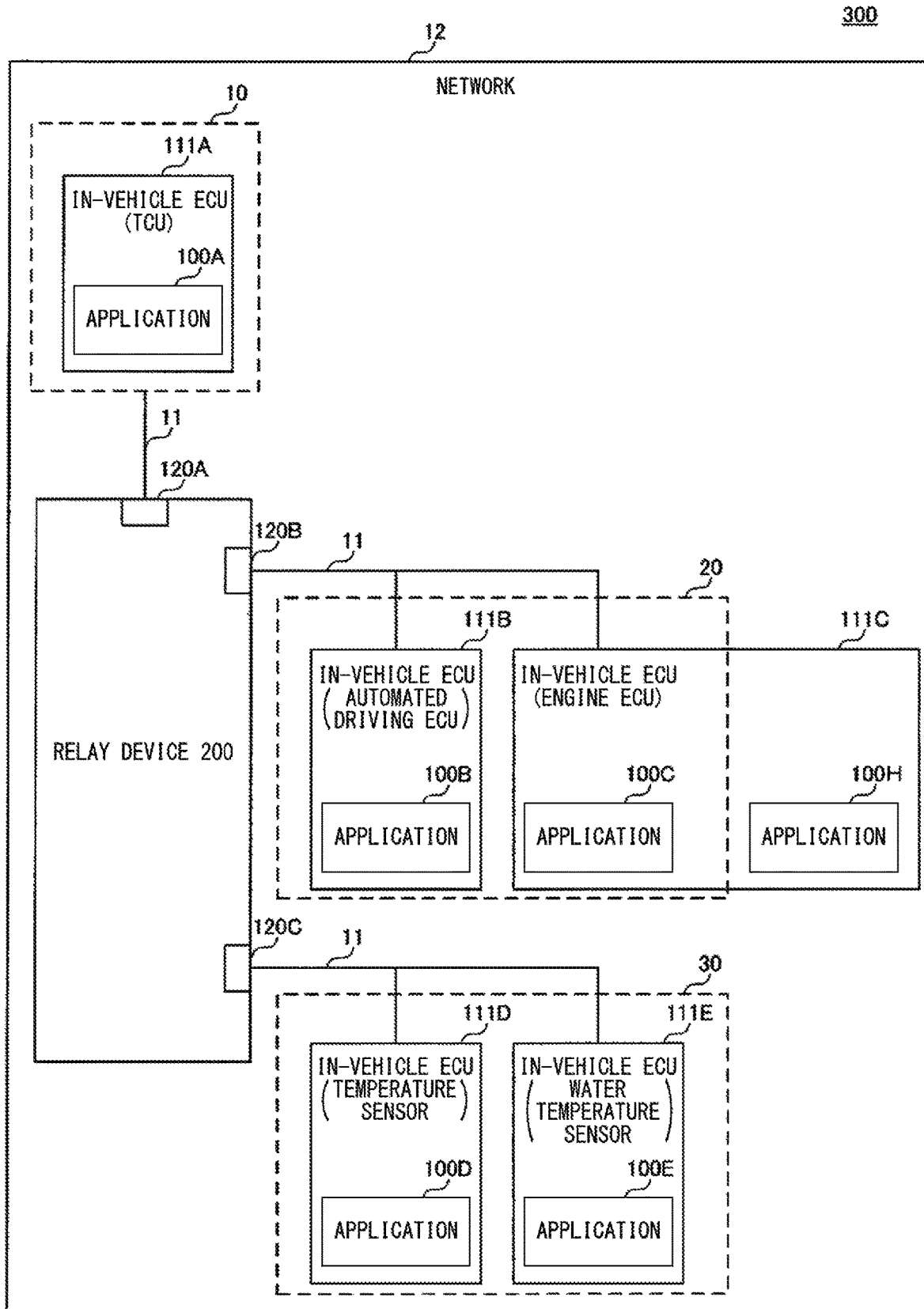
FIG. 6 shows another example of the configuration of a new network in the vehicle communication system according to the embodiment of the present disclosure.

FIG. 6 shows another example of the configuration of a new network in the vehicle communication system according to the embodiment of the present disclosure.

With reference to FIG. 6, a case where an application 100H is newly installed as a new function unit into the engine ECU 111C in the network 12 is assumed.

When the application 100H has been installed in the engine ECU 111C, the application 100H generates an Ethernet frame that includes connection request information, the ID of the application 100H, and the MAC address of the relay device 200 as the transmission destination MAC address, and transmits the generated Ethernet frame to the relay device 200.

When the detection unit 230 in the relay device 200 has received the Ethernet frame transmitted from the application 100H, the detection unit 230 performs an authentication process regarding the application 100H by using the ID and the like included in the received Ethernet frame.

When the detection unit 230 has succeeded in authentication of the application 100H, the detection unit 230 generates an Ethernet frame that includes authentication success information indicating that the authentication has been successful, and the MAC address of the engine ECU 111C as the transmission destination MAC address, and transmits the generated Ethernet frame to the engine ECU 111C via the relay unit 220.

The new function unit that is detected by the detection unit 230 is not limited to an application 100 included in an in-vehicle ECU 111 that is newly connected to the relay device 200, or an application 100 that is installed into an in-vehicle ECU 111. For example, the detection unit 230 may be configured to detect, as a new function unit, an application 100 included in an external device 113 that is added, outside the vehicle 1, to the network 12.

Figure 7:
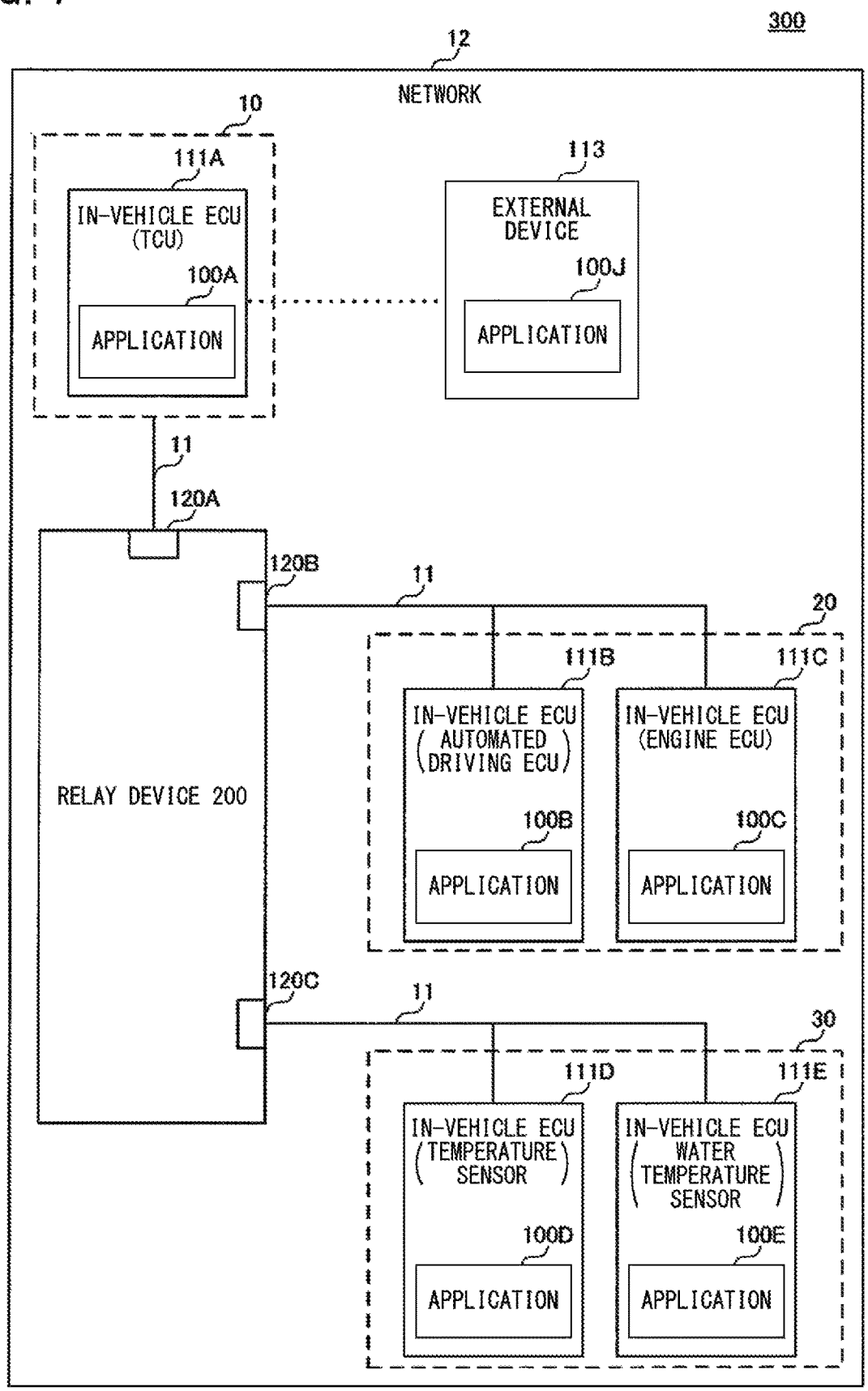
FIG. 7 shows another example of the configuration of a new network in the vehicle communication system according to the embodiment of the present disclosure.

FIG. 7 shows another example of the configuration of a new network in the vehicle communication system according to the embodiment of the present disclosure.

With reference to FIG. 7, a case where the external device 113 is newly added to the network 12 is assumed. The external device 113 is a device that is provided outside the vehicle 1. The external device 113 includes an application 100J being a new function unit.

The external device 113 can communicate with the TCU 111A. More specifically, the external device 113 can communicate with the TCU 111A via the wireless base station device 161 by using an IP packet, for example.

The external device 113 transmits connection request information for requesting communication connection in the network 12, to the detection unit 230 in the relay device 200 via the TCU 111A.

More specifically, the application 100J in the external device 113 transmits an IP packet that includes connection request information, the ID of the application 100J, and the MAC address of the relay device 200, to the wireless base station device 161 via the external network 170.

When the wireless base station device 161 has received the IP packet via the external network 170 from the external device 113, the wireless base station device 161 causes the received IP packet to be included in a radio signal, and transmits the radio signal to the TCU 111A.

When the TCU 111A has received, from the wireless base station device 161, the radio signal including the IP packet from the application 100J, the TCU 111A acquires the IP packet from the received radio signal, generates an Ethernet frame that includes the acquired IP packet and the MAC address of the relay device 200 as the transmission destination MAC address, and transmits the generated Ethernet frame to the relay device 200.

When the detection unit 230 in the relay device 200 has received the Ethernet frame from the TCU 111A, the detection unit 230 performs an authentication process regarding the application 100J by using the ID and the like included in the IP packet stored in the received Ethernet frame.

When the detection unit 230 has succeeded in authentication of the application 100J, the detection unit 230 generates an Ethernet frame that includes authentication success information indicating that the authentication has been successful, and the MAC address of the external device 113 as the transmission destination MAC address, and transmits the generated Ethernet frame to the TCU 111A.

When the TCU 111A has received the Ethernet frame from the detection unit 230, the TCU 111A acquires an IP packet from the received Ethernet frame, causes the acquired IP packet to be included in a radio signal, and transmits the radio signal to the external device 113 via the wireless base station device 161.

When the detection unit 230 has succeeded in authentication of a new function unit as described above, the detection unit 230 stores the ID, e.g., the MAC address, of the new function unit into the storage unit 270.

[Communication Connection Between Function Units]

For example, periodically or non-periodically, a new function unit and an existing function unit each transmit a discovery frame for detecting another function unit, to one or a plurality of other function units via the relay device 200. In addition, for example, periodically or non-periodically, a new function unit and an existing function unit each generate a communication setting frame being a frame for establishing communication connection with another function unit, and transmit the generated communication setting frame to one or a plurality of other function units via the relay device 200.

FIG. 8 shows an example of a communication setting frame transmitted by a function unit according to the embodiment of the present disclosure.

With reference to FIG. 8, the communication setting frame has a header, a transmission source IP address, a transmission destination IP address, an option field, a data field, and an additional information field. The data field has stored therein at least one of information that indicates the content of data that the transmission source function unit can transmit, and information that indicates the content of data that the transmission source function unit should receive.

For example, in accordance with a protocol such as SOME/IP (Scalable Service-Oriented Middleware on Ethernet/Internet Protocol), a new function unit and an existing function unit each generate a communication setting frame in which information indicating the content of data that the corresponding function unit itself can transmit is stored in the data field, and transmit the generated communication setting frame to one or a plurality of other function units via the relay device 200.

Alternatively, in accordance with a protocol such as SOME/IP, a new function unit and an existing function unit each generate a communication setting frame in which information indicating the content of data that the corresponding function unit itself should receive is stored in the data field, and transmit the generated communication setting frame to one or a plurality of other function units via the relay device 200.

With reference to FIG. 5 again, as an example, when the image sensor 111G including the application 100G being a new function unit has received authentication success information from the relay device 200, the image sensor 111G generates a communication setting frame in which information indicating that the image sensor 111G can transmit image data around the vehicle 1 is stored in the data field. Then, via the relay device 200, the image sensor 111G broadcasts the generated communication setting frame to all of the existing function units in the network 12 or multicasts the generated communication setting frame to specific existing function units.

When the automated driving ECU 111B including the application 100B being one of the existing function units in the network 12 has received the communication setting frame from the image sensor 111G, the automated driving ECU 111B generates a communication setting frame in which request information indicating that the automated driving ECU 111B should receive the image data and the IP address of the automated driving ECU 111B are stored in the data field, and transmits, as a response to the communication setting frame from the image sensor 111G, the generated communication setting frame to the image sensor 111G via the relay device 200.

The image sensor 111G and the automated driving ECU 111B establish communication connection by sending and receiving the communication setting frames and the like. After the image sensor 111G has established communication connection with the automated driving ECU 111B, the image sensor 111G periodically or non-periodically transmits image data to the automated driving ECU 111B via the relay device 200.

Meanwhile, when an existing function unit other than the automated driving ECU 111B in the network 12 has received the communication setting frame from the image sensor 111G, the existing function unit generates a communication setting frame in which information indicating that image data is not necessary is stored in the data field, and transmits, as a response to the communication setting frame from the image sensor 111G, the generated communication setting frame to the image sensor 111G via the relay device 200.

With reference to FIG. 6 again, as another example, when the engine ECU 111C including the application 100H being an installed new function unit has received authentication success information from the relay device 200, the engine ECU 111C generates a communication setting frame in which request information indicating that the engine ECU 111C should receive water temperature data of cooling water circulating in the engine in the vehicle 1 is stored in the data field. Then, via the relay device 200, the engine ECU 111C broadcasts the generated communication setting frame to all of the existing function units in the network 12 or multicasts the generated communication setting frame to specific existing function units.

When the water temperature sensor 111E including the application 100E being one of the existing function units in the network 12 has received the communication setting frame from the engine ECU 111C, the water temperature sensor 111E generates a communication setting frame in which information indicating that the water temperature sensor 111E can transmit water temperature data and the IP address of the water temperature sensor 111E are stored in the data field, and transmits, as a response to the communication setting frame from the engine ECU 111C, the generated communication setting frame to the engine ECU 111C via the relay device 200.

The water temperature sensor 111E and the engine ECU 111C establish communication connection by sending and receiving the communication setting frames and the like. After the water temperature sensor 111E has established communication connection with the engine ECU 111C, the water temperature sensor 111E periodically or non-periodically transmits water temperature data to the engine ECU 111C via the relay device 200.

Meanwhile, when an existing function unit other than the water temperature sensor 111E in the network 12 has received the communication setting frame from the engine ECU 111C, the existing function unit generates a communication setting frame in which information indicating that the existing function unit cannot transmit water temperature data is stored in the data field, and transmits, as a response to the communication setting frame from the engine ECU 111C, the generated communication setting frame to the engine ECU 111C via the relay device 200.

[Acquisition Unit]

The acquisition unit 240 acquires, from a frame that is relayed between a new function unit and an existing function unit by the relay unit 220, function unit information that includes information regarding the network configuration of a layer of a lower order than the application layer, the function unit information being of at least one of the new function unit and the existing function unit.

More specifically, at least one of the new function unit and the existing function unit transmits a communication setting frame in which function unit information is stored in the additional information field, to another function unit via the relay device 200.

Specifically, among the new function unit and the existing function units that transmit/receive communication setting frames, a publish function unit being a function unit that will, after establishment of communication connection realized by transmission/reception of the communication setting frames and the like, periodically or non-periodically transmit data by using the established communication connection, transmits, to another function unit, a communication setting frame in which function unit information is stored in the additional information field.

As an example, the image sensor 111G including the application 100G being a new function unit is a publish function unit: that transmits, to existing function units, a communication setting frame in which information indicating that the image sensor 111G can transmit image data around the vehicle 1 is stored in the data field; and that will, after establishment of communication connection with another function unit, periodically or non-periodically transmit image data by using the established communication connection. Thus, the image sensor 111G broadcasts or multicasts, to existing function units, a communication setting frame in which function unit information is stored in the additional information field.

Meanwhile, the automated driving ECU 111B including the application 100B being one of the existing function units in the network 12 is a subscribe function unit: that transmits, to the image sensor 111G, as a response to the communication setting frame from the image sensor 111G, a communication setting frame in which request information indicating that the automated driving ECU 111B should receive image data is stored in the data field; and that will not, after establishment of communication connection with the image sensor 111G, perform data transmission using the established communication connection. Thus, the automated driving ECU 111B transmits the communication setting frame to the image sensor 111G, without storing function unit information into the additional information field.

As another example, the engine ECU 111C including the application 100H being a new function unit is a subscribe function unit: that transmits, to existing function units, a communication setting frame in which request information indicating that the engine ECU 111C should receive water temperature data is stored in the data field; and that will not, after establishment of communication connection with another function unit, perform data transmission using the established communication connection. Thus, the engine ECU 111C broadcasts or multicasts the communication setting frame to existing function units, without storing function unit information into the additional information field.

Meanwhile, the water temperature sensor 111E including the application 100E being one of the existing function units in the network 12 is a publish function unit: that transmits, to the engine ECU 111C, as a response to the communication setting frame from the engine ECU 111C, a communication setting frame in which information indicating that the water temperature sensor 111E can transmit water temperature data is stored in the data field; and that will, after establishment of communication connection with the engine ECU 111C, periodically or non-periodically transmit water temperature data by using the established communication connection. Thus, the water temperature sensor 111E transmits, to the engine ECU 111C, the communication setting frame in which function unit information is stored in the additional information field.

(Specific Example of Function Unit Information)

For example, the function unit information is information that is not to be processed in a function unit that should receive a communication setting frame. More specifically, a function unit that has received a communication setting frame does not perform a process of acquiring function unit information from the additional information field in the communication setting frame, a calculation process using the function unit information, and various setting changing processes using the function unit information. For example, the function unit information is information that is to be used in generation of configuration information of a new network.

For example, as the function unit information, the new function unit and the existing function unit each store, into the additional information field in a communication setting frame, information that allows recognition of at least one of: information that allows recognition of the topology of the new network and the specifications of hardware devices such as the in-vehicle ECUs 111, the relay device 200, and the external device 113 in the new network; restriction regarding disposition of the applications 100 in the hardware devices in the new network; and restriction of the communication method in the new network.

As the information that allows recognition of the topology of the new network and the specifications of hardware devices, the new function unit and the existing function unit each store, into the additional information field in the communication setting frame, at least one type of information from among: for example, information regarding the identifier, the name, the device type indicating a sensor type, etc., the memory size, the number of physical ports provided for each communication protocol, the identifier of each physical port, the power supply configuration, the power consumption, the IDs of VLANs, the subnet address, and the function domain, of each hardware device; information regarding the specification of a CPU or a GPU (Graphics Processing Unit) installed in each hardware device; information regarding the connection relationship between hardware devices; information regarding the bandwidth of communication between hardware devices; and information regarding the specification of the relay device 200.

As the information that allows recognition of the restriction regarding disposition of the applications 100 in the hardware devices, the new function unit and the existing function unit each store, into the additional information field in a communication setting frame, at least one type of information from among, for example, pieces of information regarding the calculation speed necessary for execution, the memory use amount, restriction of the OS (Operating System) environment, and restriction of the communication protocol such as TCP (Transmission Control Protocol) and UDP (User datagram Protocol), of each application 100.

As information that allows recognition of the restriction of the communication method in the new network, the new function unit and the existing function unit each store, into the additional information field of a communication setting frame, at least one type of information from among pieces of information regarding: the communication data size; the communication frequency; necessity or unnecessity of burst transmission; the allowable delay time; the allowable amount of loss; the required security level; operation timing; the communication type indicating, e.g., periodic communication or non-periodic communication; the identifier of the application 100 to serve as a communication counterpart; and the messaging system indicating a request-response type, a publish-subscribe type, or the like, of each application 100; as well as the priority of communication by the application 100.

The new function unit and the existing function unit may each store one piece of function unit information into the additional information field in a communication setting frame, or may store a plurality of pieces of function unit information into the additional information field in a communication setting frame.

For example, the new function unit and the existing function unit each store, into the additional information field, information indicating the type of function unit information and information indicating the value of the function unit information. As an example, the new function unit and the existing function unit each store, into the additional information field, information indicating that the function unit information stored in the additional information field is the communication frequency, and "20 times/second" indicating the value of the communication frequency.

When the relay unit 220 has received a communication setting frame from the new function unit to the existing function unit, the relay unit 220 stores the received communication setting frame into the storage unit 270. When the relay unit 220 has received a communication setting frame from the existing function unit to the new function unit, the relay unit 220 stores the received communication setting frame into the storage unit 270.

Then, for example, as described above, the relay unit 220 acquires a communication setting frame from the storage unit 270, and relays the acquired communication setting frame to the transmission destination function unit, without changing transmission destination information and transmission source information that are included in the acquired communication setting frame. Accordingly, it is possible to acquire the function unit information from the frame relayed by the relay unit 220, without increasing the processing load in the relay unit 220.

Alternatively, as described above, the relay unit 220 acquires a communication setting frame from the storage unit 270, changes at least one of transmission destination information and transmission source information that are included in the acquired communication setting frame, and relays the frame after having been changed, to the transmission destination function unit.

More specifically, other than the two examples as described above, for example, the relay unit 220 receives a communication setting frame that has been broadcast or multicast from one or a plurality of function units, and changes the transmission destination MAC address of the received communication setting frame to a transmission destination MAC address corresponding to a specific communication port 120, thereby limiting the transmission destination function unit of the communication setting frame that has been broadcast or multicast. Accordingly, improvement of security and reduction of the data amount of a frame subjected to the relay process by the relay unit 220 can be realized.

The acquisition unit 240 monitors the storage unit 270. When a communication setting frame is stored into the storage unit 270 by the relay unit 220, the acquisition unit 240 acquires function unit information from the additional information field in the communication setting frame stored in the storage unit 270.

That is, for example, the acquisition unit 240 acquires function unit information from at least one of a communication setting frame from the new function unit to the existing function unit and a communication setting frame from the existing function unit to the new function unit.

The acquisition unit 240 outputs one or a plurality of pieces of function unit information having been acquired, to the generation unit 250.

[Generation Unit]

The generation unit 250 generates configuration information of a new network on the basis of the one or plurality of pieces of function unit information received from the acquisition unit 240.

More specifically, the generation unit 250 generates configuration information indicating the setting contents of the existing function unit and the new function unit for performing communication in the new network.

For example, on the basis of the one or plurality of pieces of function unit information received from the acquisition unit 240, the generation unit 250 generates configuration information that indicates the setting content of each function unit for performing communication of a layer 4 or lower layer in an OSI (Open Systems Interconnection) reference model in a new network, in consideration of the logical configuration and the physical configuration of the new network.

FIG. 9 shows an example of configuration information generated by the generation unit according to the embodiment of the present disclosure.

In the following, for convenience, the port numbers of the communication ports 120A, 120B, 120C of the relay device 200 are defined as "1", "2", "3", respectively. In addition, it is assumed that each in-vehicle ECU 111 includes one communication port and the port number of the communication port is defined as "1".

With reference to FIG. 9, for example, in the new network shown in FIG. 5, the generation unit 250 generates configuration information that indicates the content of: setting "VLAN 20" as the ID of the VLAN to which the image sensor 111G including the application 100G being a new function unit belongs; and additionally setting "VLAN 20" as the ID of the VLAN that corresponds to the communication port 120C of the relay device 200 including an application 100F.

The generation unit 250 outputs the generated configuration information to the notification unit 260, and registers the generated configuration information into the storage unit 270.

When the notification unit 260 has received the configuration information from the generation unit 250, the notification unit 260 notifies, on the basis of the received configuration information, at least one of the function units in the new network of the setting content for performing communication in the new network.

For example, on the basis of the configuration information received from the generation unit 250, the notification unit 260 notifies, via the relay unit 220, a function unit for which setting change is necessary, of the setting content. When there is no function unit for which setting change is necessary in the new network, the notification unit 260 does not perform notification of the setting content to a function unit, for example. In the example shown in FIG. 9, for example, the notification unit 260 allocates an IP address that corresponds to the VLAN 20 to the image sensor 111G including the application 100G, and notifies the image sensor 111G of the allocated IP address.

When each function unit in the new network has been notified of the setting content from the notification unit 260, the function unit performs various setting changes in accordance with the notified setting content. The function units in the new network perform communication with each other in accordance with the setting contents after having been changed.

Figure 10:
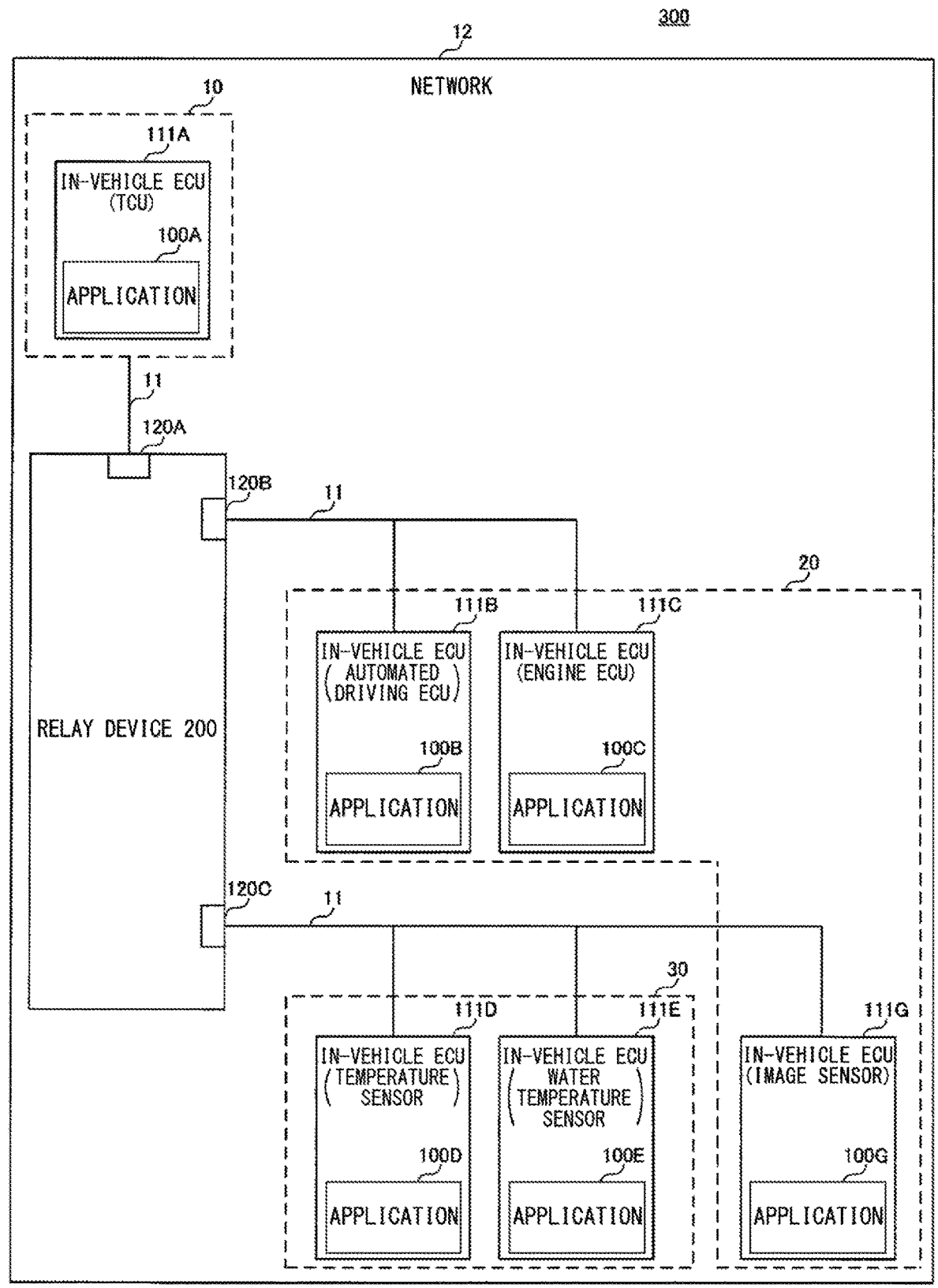
FIG. 10 shows another example of the configuration of a new network after setting change has been performed in the vehicle communication system according to the embodiment of the present disclosure.

FIG. 10 shows another example of the configuration of a new network after setting change has been performed in the vehicle communication system according to the embodiment of the present disclosure.

With reference to FIG. 10, in the new network shown in FIG. 5, the image sensor 111G and the relay device 200 perform setting change by using the setting contents notified of from the notification unit 260. As a result, the image sensor 111G becomes able to perform communication in the VLAN 20.

[Operation Flow]

Each device in the communication system according to the embodiment of the present disclosure includes a computer that includes a memory. An arithmetic processing unit such as a CPU in the computer reads out, from the memory, a program including a part or all of steps in the flow chart and sequence shown below, and executes the program. Programs of the plurality of devices can each be installed from outside. The programs of the plurality of devices are each distributed in a state of being stored in a storage medium.

Figure 11:
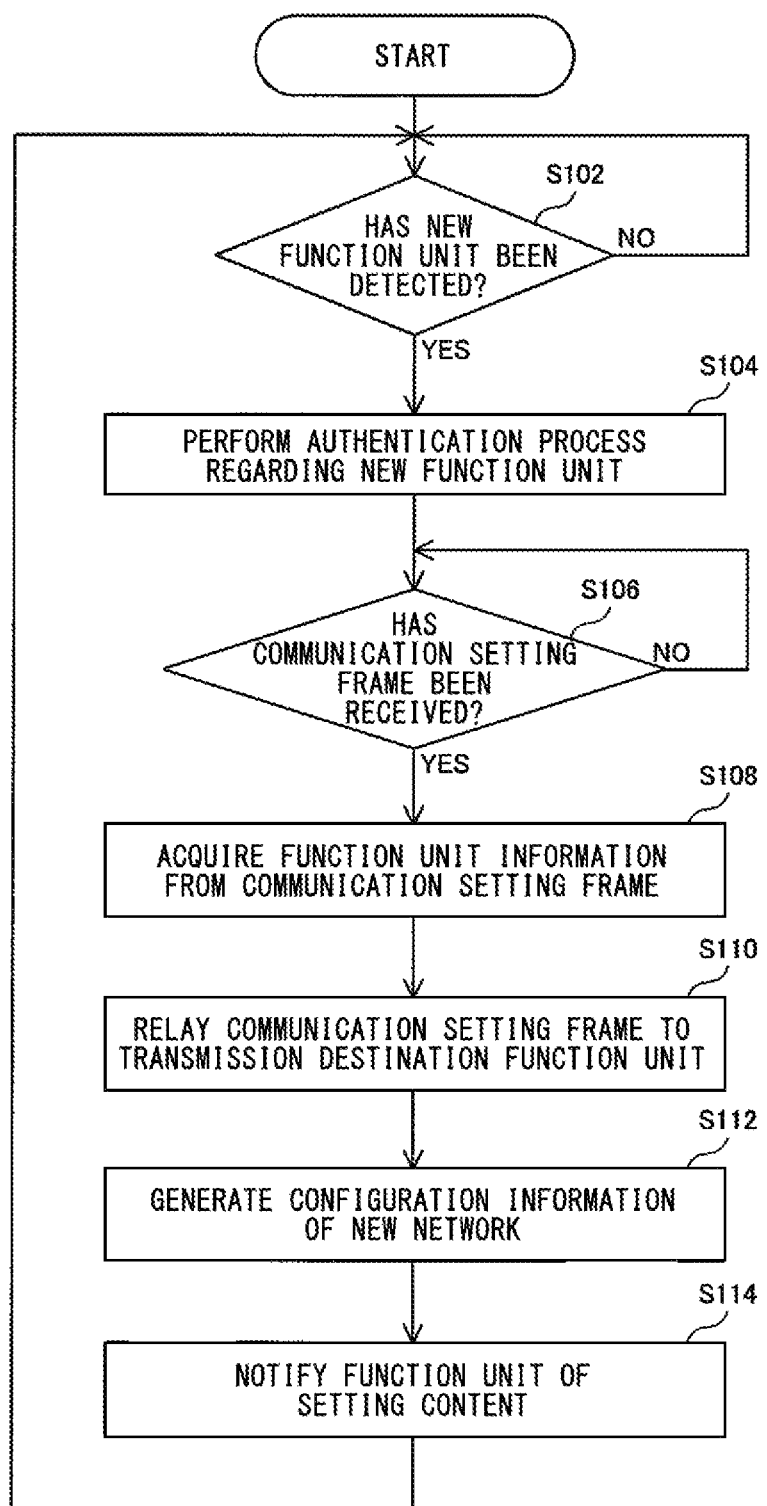
FIG. 11 is a flow chart describing an operation procedure according to which the relay device constructs a new network in the vehicle communication system according to the embodiment of the present disclosure.

FIG. 11 is a flow chart describing an operation procedure according to which the relay device constructs a new network in the vehicle communication system according to the embodiment of the present disclosure.

With reference to FIG. 11, first, the relay device 200 waits for addition of a new function unit to the network 12 (NO in step S102). Upon detecting a new function unit (YES in step S102), the relay device 200 performs an authentication process regarding the detected new function unit (step S104).

Next, the relay device 200 waits for a communication setting frame that should be relayed between the new function unit and an existing function unit (NO in step S106). Upon receiving a communication setting frame from the new function unit or an existing function unit (YES in step S106), the relay device 200 acquires function unit information of the transmission source function unit from the received communication setting frame (step S108).

Next, the relay device 200 relays the received communication setting frame to the transmission destination function unit (step S110).

Next, on the basis of the acquired function unit information, the relay device 200 generates configuration information of a new network (step S112).

Next, on the basis of the generated configuration information, the relay device 200 notifies one or a plurality of function units in the new network of a setting content (step S114).

Next, the relay device 200 waits for addition of a new function unit to the new network (NO in step S102).

The order of steps S108 and S110 is not limited to the above, and may be switched with each other.

Figure 12:
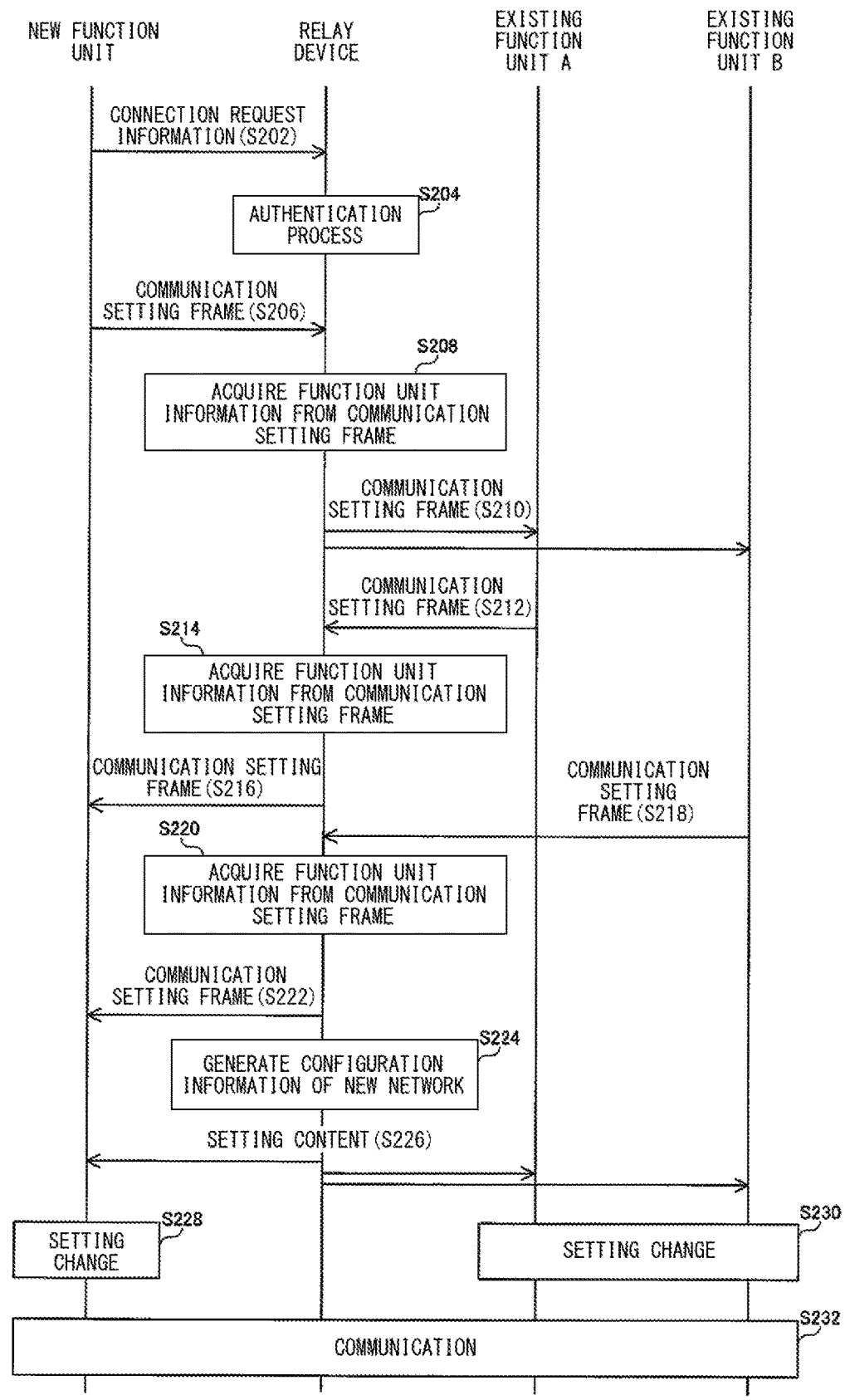
FIG. 12 shows an example of a sequence of a construction process of a new network in the vehicle communication system according to the embodiment of the present disclosure.

FIG. 12 shows an example of a sequence of a construction process of a new network in the vehicle communication system according to the embodiment of the present disclosure. FIG. 12 shows a sequence of a construction process of a new network in which a new function unit and existing function units A, B can transmit/receive data bidirectionally.

With reference to FIG. 12, first, the new function unit that is newly added to the network 12 transmits connection request information to the relay device 200 (step S202).

Next, the relay device 200 receives the connection request information from the new function unit to detect the new function unit, and performs an authentication process regarding the new function unit (step S204).

Next, the new function unit transmits, to the relay device 200, a communication setting frame that is addressed to the existing function units A, B, and that has stored therein: information indicating the content of data that the new function unit should receive and the content of data that new function unit can transmit; and function unit information of the new function unit (step S206).

Next, when the relay device 200 has received, from the new function unit, the communication setting frame addressed to the existing function units A, B, the relay device 200 acquires the function unit information from the received communication setting frame (step S208).

Next, the relay device 200 relays the communication setting frame received from the new function unit, to the existing function units A, B (step S210).

Next, the existing function unit A transmits, to the relay device 200, a communication setting frame that is addressed to the new function unit and that has stored therein: information indicating the content of data that the existing function unit A should receive and the content of data that the existing function unit A can transmit; and function unit information (step S212).

Next, when the relay device 200 has received, from the existing function unit A, the communication setting frame addressed to the new function unit, the relay device 200 acquires the function unit information from the received communication setting frame (step S214).

Next, the relay device 200 relays the communication setting frame received from the existing function unit A, to the new function unit (step S216).

Next, the existing function unit B transmits, to the relay device 200, a communication setting frame that is addressed to the new function unit and that has stored therein: information indicating the content of data that the existing function unit B should receive and the content of data that the existing function unit B can transmit; and function unit information of the existing function unit B (step S218).

Next, when the relay device 200 has received, from the existing function unit B, the communication setting frame addressed to the new function unit, the relay device 200 acquires the function unit information from the received communication setting frame (step S220).

Next, the relay device 200 relays the communication setting frame received from the existing function unit B, to the new function unit (step S222).

Next, on the basis of each piece of the acquired function unit information, the relay device 200 generates configuration information of a new network (step S224).

Next, on the basis of the generated configuration information, the relay device 200 notifies the new function unit and the existing function units A, B of setting contents (step S226).

Next, the new function unit performs various setting changes in accordance with the setting content notified of from the relay device 200 (step S228).

The existing function units A, B perform various setting changes in accordance with the setting contents notified of from the relay device 200 (step S230).

Next, the new function unit and the existing function units A, B in the new network perform communication with each other in accordance with the setting contents after having been changed (step S232).

Figure 13:
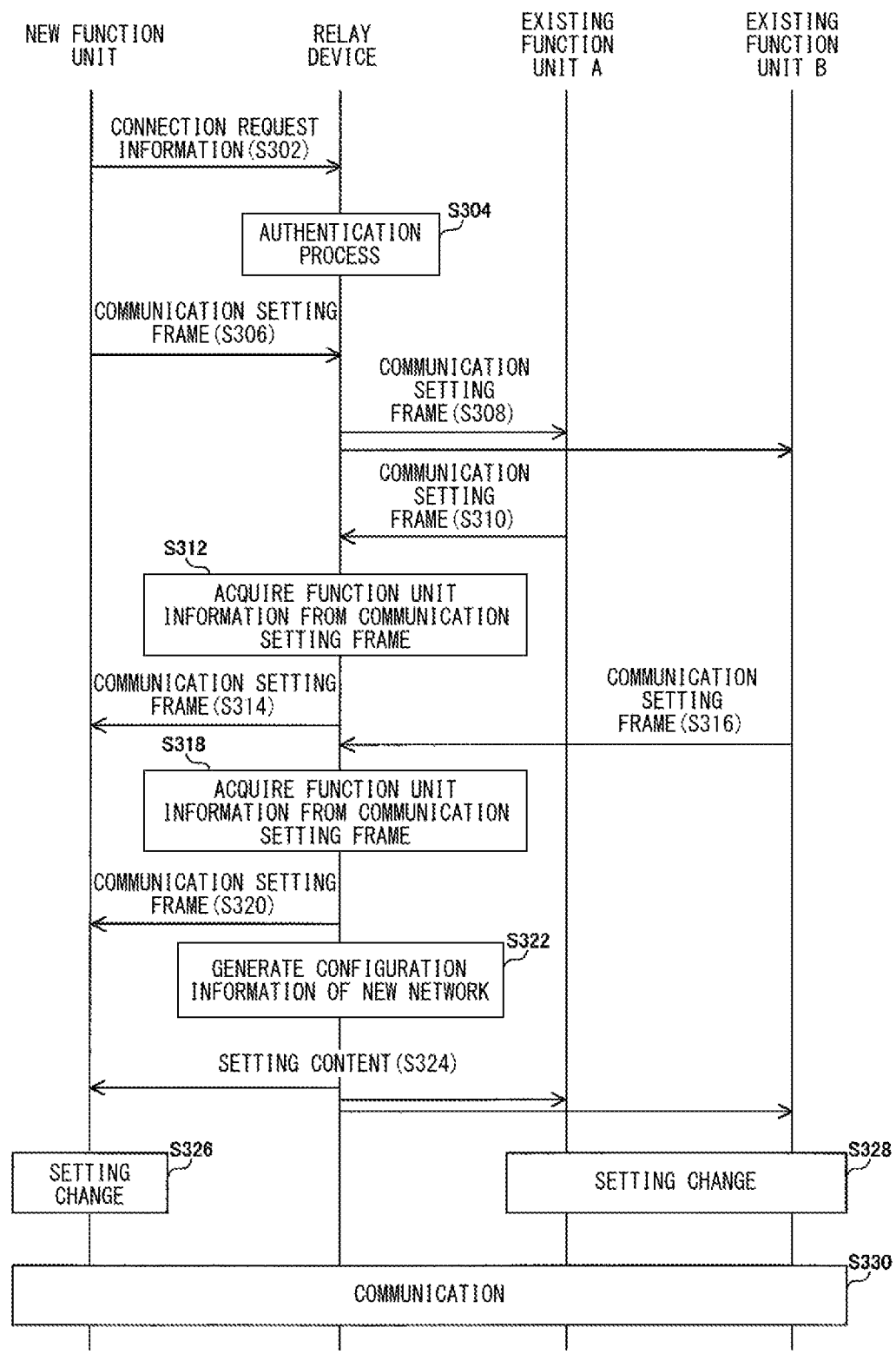
FIG. 13 shows another example of the sequence of the construction process of a new network in the vehicle communication system according to the embodiment of the present disclosure.

FIG. 13 shows another example of the sequence of the construction process of a new network in the vehicle communication system according to the embodiment of the present disclosure. FIG. 13 shows a sequence of a construction process of a new network in which the existing function units A, B being publish function units can transmit data to a new function unit being a subscribe function unit.

With reference to FIG. 13, first, the new function unit that is newly added to the network 12 transmits connection request information to the relay device 200 (step S302).

Next, the relay device 200 receives the connection request information from the new function unit to detect the new function unit, and performs an authentication process regarding the new function unit (step S304).

Next, the new function unit transmits, to the relay device 200, a communication setting frame that is addressed to the existing function units A, B and that has stored therein: information indicating the content of data that the new function unit should receive; and function unit information of the new function unit (step S306).

Next, when the relay device 200 has received, from the new function unit, the communication setting frame addressed to the existing function units A, B, the relay device 200 relays the received communication setting frame to the existing function units A, B (step S308).

Next, the existing function unit A transmits, to the relay device 200, a communication setting frame that is addressed to the new function unit and that has stored therein: information indicating the content of data that the existing function unit A can transmit; and function unit information of the existing function unit A (step S310).

Next, when the relay device 200 has received, from the existing function unit A, the communication setting frame addressed to the new function unit, the relay device 200 acquires the function unit information from the received communication setting frame (step S312).

Next, the relay device 200 relays the communication setting frame received from the existing function unit A, to the new function unit (step S314).

Next, the existing function unit B transmits, to the relay device 200, a communication setting frame that is addressed to the new function unit and that has stored therein: information indicating the content of data that the existing function unit B can transmit; and function unit information of the existing function unit B (step S316).

Next, when the relay device 200 has received, from the existing function unit B, the communication setting frame addressed to the new function unit, the relay device 200 acquires the function unit information from the received communication setting frame (step S318).

Next, the relay device 200 relays the communication setting frame received from the existing function unit B, to the new function unit (step S320).

Next, on the basis of each piece of the acquired function unit information, the relay device 200 generates configuration information of a new network (step S322).

Next, on the basis of the generated configuration information, the relay device 200 notifies the new function unit and the existing function units A, B of setting contents (step S324).

Next, the new function unit performs various setting changes in accordance with the setting content notified of from the relay device 200 (step S326).

The existing function units A, B perform various setting changes in accordance with the setting contents notified of from the relay device 200 (step S328).

Next, the new function unit and the existing function units A, B in the new network perform communication with each other in accordance with the setting contents after having been changed (step S330).

Figure 14:
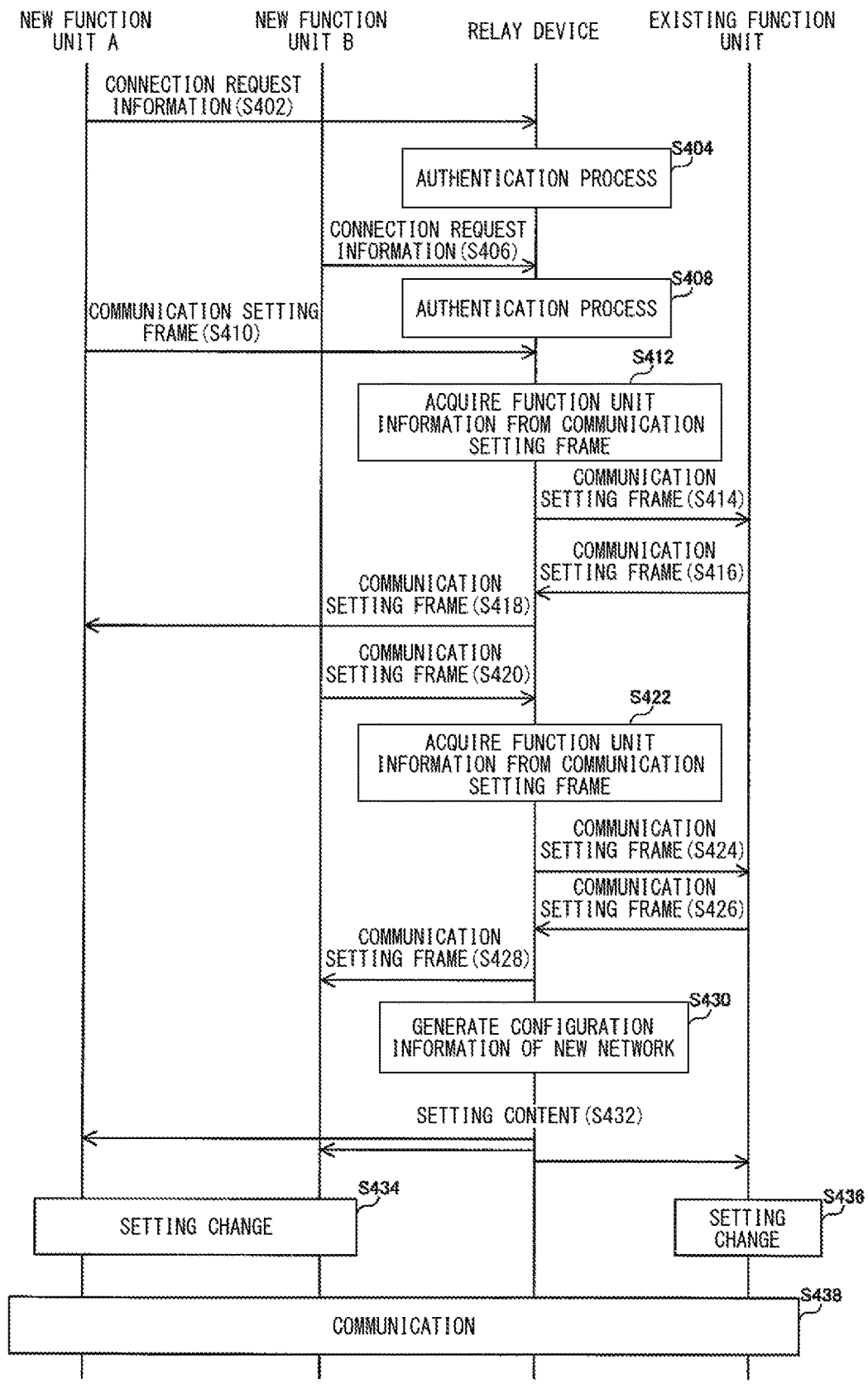
FIG. 14 shows another example of the sequence of the construction process of a new network in the vehicle communication system according to the embodiment of the present disclosure.

FIG. 14 shows another example of the sequence of the construction process of a new network in the vehicle communication system according to the embodiment of the present disclosure. FIG. 14 shows a sequence of a construction process of a new network in which new function units A, B being publish function units can transmit data to an existing function unit being a subscribe function unit.

With reference to FIG. 14, first, the new function unit A that is newly added to the network 12 transmits connection request information to the relay device 200 (step S402).

Next, the relay device 200 receives connection request information from the new function unit A to detect the new function unit A, and performs an authentication process regarding the new function unit A (step S404).

Next, the new function unit B that is newly added to the network 12 transmits connection request information to the relay device 200 (step S406).

Next, the relay device 200 receives the connection request information from the new function unit B to detect the new function unit B, and performs an authentication process regarding the new function unit B (step S408).

Next, the new function unit A transmits, to the relay device 200, a communication setting frame that is addressed to an existing function unit and that has stored therein: information indicating the content of data that the new function unit A can transmit; and function unit information of the new function unit A (step S410).

Next, when the relay device 200 has received, from the new function unit A, the communication setting frame addressed to the existing function unit, the relay device 200 acquires the function unit information from the received communication setting frame (step S412).

Next, the relay device 200 relays the communication setting frame received from the new function unit A, to the existing function unit (step S414).

Next, the existing function unit transmits, to the relay device 200, a communication setting frame that is addressed to the new function unit A and that has stored therein: the content of data that the existing function unit should receive; and function unit information of the existing function unit (step S416).

Next, the relay device 200 relays the communication setting frame received from the existing function unit, to the new function unit A (step S418).

Next, the new function unit B transmits, to the relay device 200, a communication setting frame that is addressed to the existing function unit and that has stored therein: information indicating the content of data that the new function unit B can transmit; and function unit information of the new function unit B (step S420).

Next, when the relay device 200 has received, from the new function unit B, the communication setting frame addressed to the existing function unit, the relay device 200 acquires the function unit information from the received communication setting frame (step S422).

Next, the relay device 200 relays the communication setting frame received from the new function unit B, to the existing function unit (step S424).

Next, the existing function unit transmits, to the relay device 200, a communication setting frame that is addressed to the new function unit B and that has stored therein: the content of data that the existing function unit should receive; and function unit information of the existing function unit (step S426).

Next, the relay device 200 relays the communication setting frame received from the existing function unit, to the new function unit B (step S428).

Next, on the basis of each piece of the acquired function unit information, the relay device 200 generates configuration information of a new network (step S430).

Next, on the basis of the generated configuration information, the relay device 200 notifies the new function units A, B and the existing function unit of setting contents (step S432).

Next, the new function units A, B perform various setting changes in accordance with the setting contents notified of from the relay device 200 (step S434).

The existing function unit performs various setting changes in accordance with the setting content notified of from the relay device 200 (step S436).

Next, the new function units A, B and the existing function unit in the new network perform communication with each other in accordance with the setting contents after having been changed (step S438).

In the relay device 200 according to the embodiment of the present disclosure, when an in-vehicle ECU 111 or an external device has been added to the network 12, the detection unit 230 detects an application 100 included in the in-vehicle ECU 111 or the external device as a new function unit. However, the present disclosure is not limited thereto. The detection unit 230 may be configured to detect, as a new function unit, an in-vehicle ECU 111 or an external device that is added to the network 12 and that does not have installed therein an application 100.

In the relay device 200 according to the embodiment of the present disclosure, the generation unit 250 outputs generated configuration information to the notification unit 260, and on the basis of the configuration information received from the generation unit 250, the notification unit 260 notifies a function unit for which setting change is necessary, of the setting content. However, the present disclosure is not limited thereto. The generation unit 250 may be configured to generate configuration information of a new network, for example, in which setting change in a function unit is not necessary. In this case, the relay device 200 may be configured not to be provided with the notification unit 260.

In the vehicle communication system 300 according to the embodiment of the present disclosure, the function unit information is information that is not to be processed in a function unit that should receive a communication setting frame. However, the present disclosure is not limited thereto. The function unit information may be information that is to be processed in a function unit that should receive a communication setting frame.

In the vehicle communication system 300 according to the embodiment of the present disclosure, the function unit information is information that is to be used in generation of configuration information of a new network. However, the present disclosure is not limited thereto. The function unit information may be used in any process other than generation of configuration information of a new network.

In the relay device 200 according to the embodiment of the present disclosure, the generation unit 250 generates configuration information of a new network on the basis of function unit information received from the acquisition unit 240. However, the present disclosure is not limited thereto. The relay device 200 may be configured not to be provided with the generation unit 250. Alternatively, the relay device 200 may be provided with, instead of the generation unit 250, a configuration information acquisition unit that acquires, from outside, configuration information of a new network generated on the basis of function unit information acquired by the acquisition unit 240.

Meanwhile, a technology that allows easy acquisition of information of function units in a new network when a new function unit has been added to a network, is desired.

For example, when a function unit is newly added to a network to construct a new network, there are cases where communication required by a higher order layer cannot be realized due to the network configuration and restriction of a lower order layer.

An example of the network configuration and restriction of a lower order layer is restriction of the communication band of the physical layer. In particular, in the case of a network for which reduced cost is required, e.g., a network that includes in-vehicle function units such as in-vehicle ECUs, it is sometimes difficult, due to restriction of the communication band as described above, to add a new function unit to the network while maintaining stable operation in the network.

Therefore, in order to flexibly construct a network having a new configuration while maintaining stable operation in the network, a technology that allows easy acquisition of information of function units in the new network, is desired.

In this regard, the relay device 200 according to the embodiment of the present disclosure is installed in the vehicle 1. In the relay device 200, the detection unit 230 detects a new function unit being a function unit that is newly added to the network 12 including an existing function unit being one or a plurality of function units. The relay unit 220 relays a frame between function units. The acquisition unit 240 acquires, from a frame, relayed by the relay unit 220, between the new function unit detected by the detection unit 230 and the existing function unit, function unit information that includes information regarding a network configuration of a layer of a lower order than an application layer, the function unit information being of at least one of the new function unit and the existing function unit.

Thus, with this configuration in which the function unit information is acquired from the frame between function units, the function unit information can be acquired from the frame that should be relayed between the new function unit and the existing function unit in order to establish communication connection between the new function unit and the existing function unit, for example. Therefore, it is possible to acquire the function unit information without sending and receiving a frame for acquiring the function unit information between function units.

Therefore, in the relay device 200 according to the embodiment of the present disclosure, information of a network to which a new function unit has been added can be easily acquired.

In the relay device 200 according to the embodiment of the present disclosure, the function unit information is information that is to be used in generation of configuration information of a new network being the network 12 that further includes the new function unit.

With this configuration, it is possible to construct a new network in consideration of the network configuration and restriction of a layer of a lower order than the application layer, for example. Accordingly, for example, occurrence of delay in high importance communication due to addition of a new function unit to the network can be suppressed.

In the relay device 200 according to the embodiment of the present disclosure, the acquisition unit 240 acquires the function unit information from the frame transmitted by the new function unit and relayed to the existing function unit.

With this configuration, for example, the function unit information can be acquired from the frame transmitted by the new function unit that should transmit data to the existing function unit after establishment of communication connection.

In the relay device 200 according to the embodiment of the present disclosure, the acquisition unit 240 acquires the function unit information from the frame transmitted by the existing function unit and relayed to the new function unit.

With this configuration, for example, the function unit information can be acquired from the frame transmitted by the existing function unit that should transmit data to the new function unit after establishment of communication connection.

In the relay device 200 according to the embodiment of the present disclosure, without changing transmission destination information and transmission source information that are included in the frame received from the function unit, the relay unit 220 relays the frame to another function unit. The acquisition unit 240 acquires the function unit information from the frame relayed by the relay unit 220.

With this configuration, in the relay device 200 that performs snooping on the frame between function units, the function unit information can be easily acquired.

In the relay device 200 according to the embodiment of the present disclosure, the relay unit 220 changes at least one of transmission destination information and transmission source information that are included in the frame received from the function unit, and relays the frame after having been changed, to another function unit. The acquisition unit 240 acquires the function unit information from the frame relayed by the relay unit 220.

With this configuration, in the relay device 200 functioning as a proxy server, the function unit information can be easily acquired.

In the relay device 200 according to the embodiment of the present disclosure, the generation unit 250 generates configuration information of a new network being the network that further includes the new function unit, on the basis of the function unit information acquired by the acquisition unit 240.

With this configuration, it is possible to construct a new network in consideration of the network configuration and restriction of a layer of a lower order than the application layer, by using the function unit information. Accordingly, for example, occurrence of delay in high importance communication due to addition of a new function unit to the network can be suppressed.

In the relay device 200 according to the embodiment of the present disclosure, the function unit information is information that is not to be processed in a function unit that should receive the frame.

With this configuration, the function unit information can be acquired from the frame without increasing the processing load in the function unit that should receive the frame.

In the relay device 200 according to the embodiment of the present disclosure, the detection unit 230: detects, as the new function unit, at least one of an application 100 included in an in-vehicle ECU 111 that is newly added to the network 12, an application 100 that is newly installed into an in-vehicle ECU 111 in the network 12, and an application 100 included in the external device 113 that is newly added, outside the vehicle 1, to the network 12; performs an authentication process regarding the new function unit detected; and notifies the new function unit of a result of the authentication process.

With this configuration, diverse new function units can be detected, and a new network 12 can be constructed.

The vehicle 1 according to the embodiment of the present disclosure includes the relay device 200.

With this configuration, in the vehicle 1 including the relay device 200, information of a network to which a new function unit has been added can be easily acquired.

In the vehicle communication system 300 according to the embodiment of the present disclosure, existing function units form the network 12. A new function unit is newly added to the network 12. The relay device 200 installed in the vehicle 1 detects addition of the new function unit to the network 12. The new function unit or an existing function unit transmits a frame that is addressed to another function unit and that has stored therein function unit information that includes information regarding a network configuration of a layer of a lower order than an application layer. The relay device 200 acquires the function unit information from the frame transmitted by the new function unit or the existing function unit.

Thus, with this configuration in which the function unit information is acquired from the frame transmitted by the new function unit or the existing function unit, the function unit information can be acquired from the frame that should be relayed between the new function unit and the existing function unit in order to establish communication connection between the new function unit and the existing function unit, for example. Therefore, it is possible to acquire the function unit information without sending and receiving a frame for acquiring the function unit information between function units.

Therefore, in the vehicle communication system 300 according to the embodiment of the present disclosure, information of a network to which a new function unit has been added can be easily acquired.

A communication method according to the embodiment of the present disclosure is a communication method performed in the relay device 200 that is installed in the vehicle 1 and that relays a frame between function units. In this communication method, first, the relay device 200 detects a new function unit being a function unit that is newly added to the network 12 including an existing function unit being one or a plurality of function units. Next, the relay device 200 acquires, from the frame that should be relayed between the new function unit detected and the existing function unit, function unit information that includes information regarding a network configuration of a layer of a lower order than an application layer, the function unit information being of at least one of the new function unit and the existing function unit.

Thus, with this method in which the function unit information is acquired from the frame that should be relayed between the new function unit and the existing function unit, the function unit information can be acquired from the frame that should be relayed between the new function unit and the existing function unit in order to establish communication connection between the new function unit and the existing function unit, for example. Therefore, it is possible to acquire the function unit information without sending and receiving a frame for acquiring the function unit information between function units.

Therefore, in the communication method according to the embodiment of the present disclosure, information of a network to which a new function unit has been added can be easily acquired.

A communication method according to the embodiment of the present disclosure is a communication method performed in the vehicle communication system 300. The vehicle communication system 300 includes: the relay device 200 installed in the vehicle 1; one or a plurality of existing function units forming the network 12; and a new function unit that is newly added to the network 12. In this communication method, first, the relay device 200 detects addition of the new function unit to the network 12. Next, the new function unit or an existing function unit transmits a frame that is addressed to another function unit and that has stored therein function unit information that includes information regarding a network configuration of a layer of a lower order than an application layer. Next, the relay device 200 acquires function unit information from the frame transmitted by the new function unit or the existing function unit.

With this method in which the function unit information is acquired from the frame transmitted by the new function unit or the existing function unit, the function unit information can be acquired from the frame that should be relayed between the new function unit and the existing function unit in order to establish communication connection between the new function unit and the existing function unit, for example. Therefore, it is possible to acquire the function unit information without sending and receiving a frame for acquiring the function unit information between function units.

Therefore, in the communication method according to the embodiment of the present disclosure, information of a network to which a new function unit has been added can be easily acquired.

The above embodiment is merely illustrative in all aspects and should not be recognized as being restrictive. The scope of the present disclosure is defined by the scope of the claims rather than by the description above, and is intended to include meaning equivalent to the scope of the claims and all modifications within the scope.

The above description includes the features in the additional notes below.

[Additional Note 1]

A relay device comprising:
  a detection unit configured to detect a new function unit being a function unit that is newly added to a network including an existing function unit being one or a plurality of function units;
  a relay unit configured to relay a frame between the function units;

an acquisition unit configured to acquire, from the frame, relayed by relay unit, between the new function unit detected by the detection unit and the existing function unit, function unit information that includes information regarding a network configuration of a layer of a lower order than an application layer, the function unit information being of at least one of the new function unit and the existing function unit; and a generation unit configured to generate configuration information of a new network being the network that further includes the new function unit, on the basis of the function unit information acquired by the acquisition unit, wherein the acquisition unit acquires the function unit information from the frame transmitted by a function unit, out of the new function unit and the existing function unit, that performs data transmission in the new network.

[Additional Note 2]

A vehicle communication system comprising:

a relay device;

an existing function unit being one or a plurality of function units forming a network; and a new function unit being a function unit that is newly added to the network, wherein the relay device detects addition of the new function unit to the network, a function unit, out of the new function unit or the existing function unit, that performs data transmission in a new network being the network that further includes the new function unit transmits a frame that is addressed to another function unit and that has stored therein function unit information that includes information regarding a network configuration of a layer of a lower order than an application layer, and the relay device acquires the function unit information from the frame transmitted by the new function unit or the existing function unit.

[Additional Note 3]

A relay device including a processor, the processor realizing:

a detection unit configured to detect a new ECU being an in-vehicle ECU that is newly added to a network including an existing ECU being one or a plurality of in-vehicle ECUs;

a relay unit configured to relay a frame between the in-vehicle ECUs;

an acquisition unit configured to acquire, from the frame, relayed by the relay unit, between the new ECU detected by the detection unit and the existing ECU, function unit information that includes information regarding a network configuration of a layer of a lower order than an application layer, the function unit information being of at least one of the new ECU and the existing ECU; and a generation unit configured to generate configuration information of a new network being the network that further includes the new ECU, on the basis of the function unit information acquired by the acquisition unit, wherein the acquisition unit acquires the function unit information from the frame transmitted by an in-vehicle ECU, out of the new ECU and the existing ECU, that performs data transmission in the new network.

[Additional Note 4]

A vehicle communication system comprising:

a relay device;

an existing ECU being one or a plurality of in-vehicle ECUs forming a network; and a new ECU being an in-vehicle ECU that is newly added to the network, wherein a CPU in the relay device detects addition of the new ECU to the network, an in-vehicle ECU, out of the new ECU or the existing ECU, that performs data transmission in a new network being the network that further includes the new ECU transmits a frame that is addressed to another in-vehicle ECU and that has stored therein function unit information that includes information regarding a network configuration of a layer of a lower order than an application layer, and the CPU in the relay device acquires the function unit information from the frame transmitted by the new ECU or the existing ECU.

REFERENCE SIGNS LIST 1 vehicle
10 VLAN
11 Ethernet cable
12 network
20 VLAN
30 VLAN
100 application
111 in-vehicle ECU
113 external device
120 communication port
161 wireless base station device
170 external network
180 server
200 relay device
220 relay unit
230 detection unit
240 acquisition unit
250 generation unit
260 notification unit
270 storage unit
300 vehicle communication system
400 communication system

The invention claimed is:

1. A relay device installed in a vehicle, the relay device comprising:

a detection unit configured to detect a new function unit being a function unit that is newly added to a network including an existing function unit being one or a plurality of function units;

a relay unit configured to relay a frame between the function units; and an acquisition unit configured to acquire, from the frame, relayed by the relay unit, between the new function unit detected by the detection unit and the existing function unit, function unit information that includes information regarding a network configuration of a layer of a lower order than an application layer, the function unit information being of at least one of the new function unit and the existing function unit, wherein:

among the new function unit and the existing function unit, a publish function unit that transmits data after establishment of communication connection with another function unit, transmits a first communication setting frame for the establishment of the communication connection with the other function unit, the first communication setting frame including information indicating a content of data that can be transmitted by the publish function unit, and the function unit information, among the new function unit and the existing function unit, a subscribe function unit that does not transmit data after establishment of communication connection with another function unit, transmits a second communication setting frame for the establishment of the communication connection with the other function unit, the second communication setting frame including information indicating a content of data to be received by the subscribe function unit, and the first communication setting frame includes a first field that stored therein at least one of information that indicates a content of data that a transmission source function unit can transmit, and information that indicates a content of data that a transmission source function unit should receive, and a second field that stored therein the function unit information.

2. The relay device according to claim 1, wherein the function unit information is information that is to be used in generation of configuration information of a new network being the network that further includes the new function unit.

3. The relay device according to claim 1, wherein the acquisition unit acquires the function unit information from the frame transmitted by the new function unit and relayed to the existing function unit.

4. The relay device according to claim1, wherein the acquisition unit acquires the function unit information from the frame transmitted by the existing function unit and relayed to the new function unit.

5. The relay device according to claim1, wherein without changing transmission destination information and transmission source information that are included in the frame received from the function unit, the relay unit relays the frame to another function unit, and the acquisition unit acquires the function unit information from the frame relayed by the relay unit.

6. The relay device according to claim1, wherein the relay unit changes at least one of transmission destination information and transmission source information that are included in the frame received from the function unit, and relays the frame after having been changed, to another function unit, and the acquisition unit acquires the function unit information from the frame relayed by the relay unit.

7. The relay device according to claim1, further including a generation unit configured to generate configuration information of a new network being the network that further includes the new function unit, on the basis of the function unit information acquired by the acquisition unit.

8. The relay device according to claim1, wherein the function unit information is information that is not to be processed in a function unit that should receive the frame.

9. The relay device according to claim1, wherein the detection unit: detects, as the new function unit, at least one of an application included in an in-vehicle ECU (Electronic Control Unit) that is newly added to the network, an application that is newly installed into an in-vehicle ECU in the network, and an application included in an external device that is newly added, outside the vehicle, to the network; performs an authentication process regarding the new function unit detected; and notifies the new function unit of a result of the authentication process.

10. A vehicle communication system comprising:
a relay device installed in a vehicle;
an existing function unit being one or a plurality of function units forming a network; and
a new function unit being a function unit that is newly added to the network, wherein
the relay device detects addition of the new function unit to the network,
the new function unit or the existing function unit transmits a frame that is addressed to another function unit and that has stored therein function unit information that includes information regarding a network configuration of a layer of a lower order than an application layer, and
the relay device acquires the function unit information from the frame transmitted by the new function unit or the existing function unit, wherein:
among the new function unit and the existing function unit, a publish function unit that transmits data after establishment of communication connection with another function unit, transmits a first communication setting frame for the establishment of the communication connection with the other function unit, the first communication setting frame including information indicating a content of data that can be transmitted by the publish function unit, and the function unit information,
among the new function unit and the existing function unit, a subscribe function unit that does not transmit data after establishment of communication connection with another function unit, transmits a second communication setting frame for the establishment of the communication connection with the other function unit, the second communication setting frame including information indicating a content of data to be received by the subscribe function unit, and
the first communication setting frame includes a first field that stored therein at least one of information that indicates a content of data that a transmission source function unit can transmit, and information that indicates a content of data that a transmission source function unit should receive, and a second field that stored therein the function unit information.

11. A communication method to be performed in a relay device, the relay device installed in a vehicle and configured to relay a frame between function units, the communication method comprising the steps of:
detecting a new function unit being a function unit that is newly added to a network including an existing function unit being one or a plurality of the function units; and
acquiring, from the frame that should be relayed between the new function unit detected and the existing function unit, function unit information that includes information regarding a network configuration of a layer of a lower order than an application layer, the function unit information being of at least one of the new function unit and the existing function unit, wherein:
among the new function unit and the existing function unit, a publish function unit that transmits data after establishment of communication connection with another function unit, transmits a first communication setting frame for the establishment of the communication connection with the other function unit, the first communication setting frame including information indicating a content of data that can be transmitted by the publish function unit, and the function unit information, among the new function unit and the existing function unit, a subscribe function unit that does not transmit data after establishment of communication connection with another function unit, transmits a second communication setting frame for the establishment of the communication connection with the other function unit, the second communication setting frame including information indicating a content of data to be received by the subscribe function unit, and the first communication setting frame includes a first field that stored therein at least one of information that indicates a content of data that a transmission source function unit can transmit, and information that indicates a content of data that a transmission source function unit should receive, and a second field that stored therein the function unit information.

12. A communication method to be performed in a vehicle communication system, the vehicle communication system including a relay device installed in a vehicle, an existing function unit being one or a plurality of function units forming a network, and a new function unit being a function unit that is newly added to the network, the communication method comprising the steps of:

detecting, performed by the relay device, addition of the new function unit to the network;

transmitting, performed by the new function unit or the existing function unit, a frame that is addressed to another function unit and that has stored therein function unit information that includes information regarding a network configuration of a layer of a lower order than an application layer; and acquiring, performed by the relay device, the function unit information from the frame transmitted by the new function unit or the existing function unit, wherein:

among the new function unit and the existing function unit, a publish function unit that transmits data after establishment of communication connection with another function unit, transmits a first communication setting frame for the establishment of the communication connection with the other function unit, the first communication setting frame including information indicating a content of data that can be transmitted by the publish function unit, and the function unit information, among the new function unit and the existing function unit, a subscribe function unit that does not transmit data after establishment of communication connection with another function unit, transmits a second communication setting frame for the establishment of the communication connection with the other function unit, the second communication setting frame including information indicating a content of data to be received by the subscribe function unit, and the first communication setting frame includes a first field that stored therein at least one of information that indicates a content of data that a transmission source function unit can transmit, and information that indicates a content of data that a transmission source function unit should receive, and a second field that stored therein the function unit information.

13. A computer-readable non-transitory storage medium having stored therein a communication program to be used in a relay device installed in a vehicle, the communication program being for causing a computer to function as:

a detection unit configured to detect a new function unit being a function unit that is newly added to a network including an existing function unit being one or a plurality of function units;

a relay unit configured to relay a frame between the function units; and an acquisition unit configured to acquire, from the frame, relayed by the relay unit, between the new function unit detected by the detection unit and the existing function unit, function unit information that includes information regarding a network configuration of a layer of a lower order than an application layer, the function unit information being of at least one of the new function unit and the existing function unit, wherein:

among the new function unit and the existing function unit, a publish function unit that transmits data after establishment of communication connection with another function unit, transmits a first communication setting frame for the establishment of the communication connection with the other function unit, the first communication setting frame including information indicating a content of data that can be transmitted by the publish function unit, and the function unit information, among the new function unit and the existing function unit, a subscribe function unit that does not transmit data after establishment of communication connection with another function unit, transmits a second communication setting frame for the establishment of the communication connection with the other function unit, the second communication setting frame including information indicating a content of data to be received by the subscribe function unit, and the first communication setting frame includes a first field that stored therein at least one of information that indicates a content of data that a transmission source function unit can transmit, and information that indicates a content of data that a transmission source function unit should receive, and a second field that stored therein the function unit information.

* * * * *